(12) United States Patent
Muto et al.

(10) Patent No.: US 7,600,089 B2
(45) Date of Patent: *Oct. 6, 2009

(54) STORAGE APPARATUS FOR ASYNCHRONOUS REMOTE COPYING

(75) Inventors: Yoshiaki Muto, Odawara (JP); Hisaharu Takeuchi, Odawara (JP)

(73) Assignee: Hitachi, Ltd., Tokyo (JP)

( * ) Notice: Subject to any disclaimer, the term of this patent is extended or adjusted under 35 U.S.C. 154(b) by 295 days.

This patent is subject to a terminal disclaimer.

(21) Appl. No.: 11/640,240

(22) Filed: Dec. 18, 2006

(65) Prior Publication Data

US 2007/0101078 A1   May 3, 2007

Related U.S. Application Data

(63) Continuation of application No. 10/848,150, filed on May 19, 2004, now Pat. No. 7,171,517.

(30) Foreign Application Priority Data

Mar. 23, 2004   (JP)   ............................. 2004-085032

(51) Int. Cl.
*G06F 12/00* (2006.01)
(52) U.S. Cl. .................. 711/162; 711/112; 711/114
(58) Field of Classification Search .................. 711/162, 711/161, 165, 114, 111, 112, 113; 710/8
See application file for complete search history.

(56) References Cited

U.S. PATENT DOCUMENTS

| | | | |
|---|---|---|---|
| 5,437,022 A | 7/1995 | Beardsley et al. | |
| 5,446,871 A | 8/1995 | Shomler et al. | |
| 5,574,950 A | * | 11/1996 | Hathorn et al. ................ 710/8 |
| 5,742,792 A | 4/1998 | Yanai et al. | |

(Continued)

FOREIGN PATENT DOCUMENTS

EP   1150210 A2   9/2000

(Continued)

OTHER PUBLICATIONS

Ji et al., "Seneca: Remote Mirroring Done Write", proceedings of USENIX Technical Conference, (Jun. 2003), pp. 253-268.

(Continued)

*Primary Examiner*—Pierre-Michel Bataille
(74) *Attorney, Agent, or Firm*—Stites & Harbison PLLC; Juan Carlos A. Marquez, Esq.

(57) ABSTRACT

A storage apparatus is provided in which the data amount of transfer data to a secondary disk controller from a primary disk controller at the event of remote copying can be reduced, and data integrity also can be assured. According to the storage apparatus, in the primary disk controller, overwriting update data in same records during a specified time between a preset first base point and a preset second base point on the update data that are stored in the second area of the cache memory and that are to be transferred to the secondary disk controller; and in the secondary disk controller, handling the update data between the first base point and the second base point as real data having consistency.

19 Claims, 17 Drawing Sheets

U.S. PATENT DOCUMENTS

| | | | |
|---|---|---|---|
| 5,832,515 | A | 11/1998 | Ledain et al. |
| 5,889,935 | A | 3/1999 | Ofek et al. |
| 5,901,327 | A | 5/1999 | Ofek |
| 5,996,054 | A | 11/1999 | Ledain et al. |
| 6,021,408 | A | 2/2000 | Ledain et al. |
| 6,044,444 | A | 3/2000 | Ofek |
| 6,052,797 | A | 4/2000 | Ofek et al. |
| 6,167,531 | A | 12/2000 | Sliwinski |
| 6,173,377 | B1 | 1/2001 | Yanai et al. |
| 6,377,959 | B1 | 4/2002 | Carlson |
| 6,502,205 | B1 | 12/2002 | Yanai et al. |
| 6,842,825 | B2 | 1/2005 | Geiner et al. |
| 7,415,589 | B2 * | 8/2008 | Hirakawa et al. ............ 711/162 |
| 2002/0046323 | A1 * | 4/2002 | Kawano ..................... 711/114 |
| 2002/0156972 | A1 * | 10/2002 | McKnight et al. ........... 711/114 |
| 2003/0204649 | A1 * | 10/2003 | Kanai et al. .................... 710/8 |
| 2004/0034752 | A1 | 2/2004 | Ohran |
| 2004/0186968 | A1 | 9/2004 | Factor et al. |
| 2004/0193802 | A1 | 9/2004 | Meiri et al. |
| 2004/0193816 | A1 | 9/2004 | Meiri et al. |
| 2004/0236983 | A1 | 11/2004 | Burton et al. |
| 2004/0260735 | A1 | 12/2004 | Martinez et al. |
| 2004/0260896 | A1 | 12/2004 | Werner et al. |
| 2005/0066122 | A1 | 3/2005 | Longinov et al. |
| 2005/0120056 | A1 | 6/2005 | Meiri et al. |
| 2005/0132248 | A1 | 6/2005 | Lecrone et al. |
| 2005/0149666 | A1 | 7/2005 | Meiri et al. |
| 2005/0198454 | A1 | 9/2005 | Yoder et al. |

FOREIGN PATENT DOCUMENTS

| | | |
|---|---|---|
| JP | 2003-202962 | 9/1997 |

OTHER PUBLICATIONS

European Search Report dated Mar. 14, 2005.

Office Action issued from European Patent Office on Mar. 23, 2006.

Daniel Asselin, et al., "Implementing Concurrent Copy", Dec. 1993, IBM.

IBM Technical Disclosure Bulletin NB9404145, "Concurrent Copy", Apr. 1, 1994.

IBM Technical Disclosure Bulletin NA9402481, "Method for Improving the HostI/Performance During Concurrent Copy", Feb. 1, 1994.

* cited by examiner

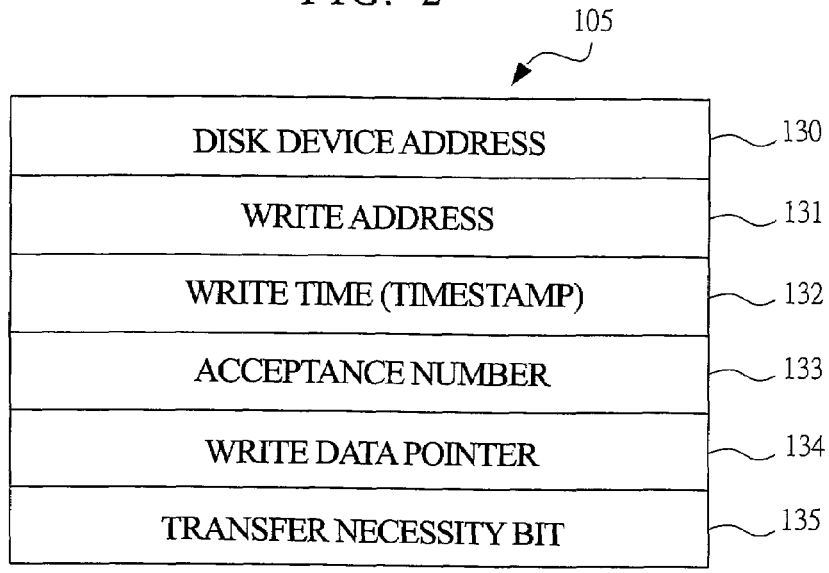
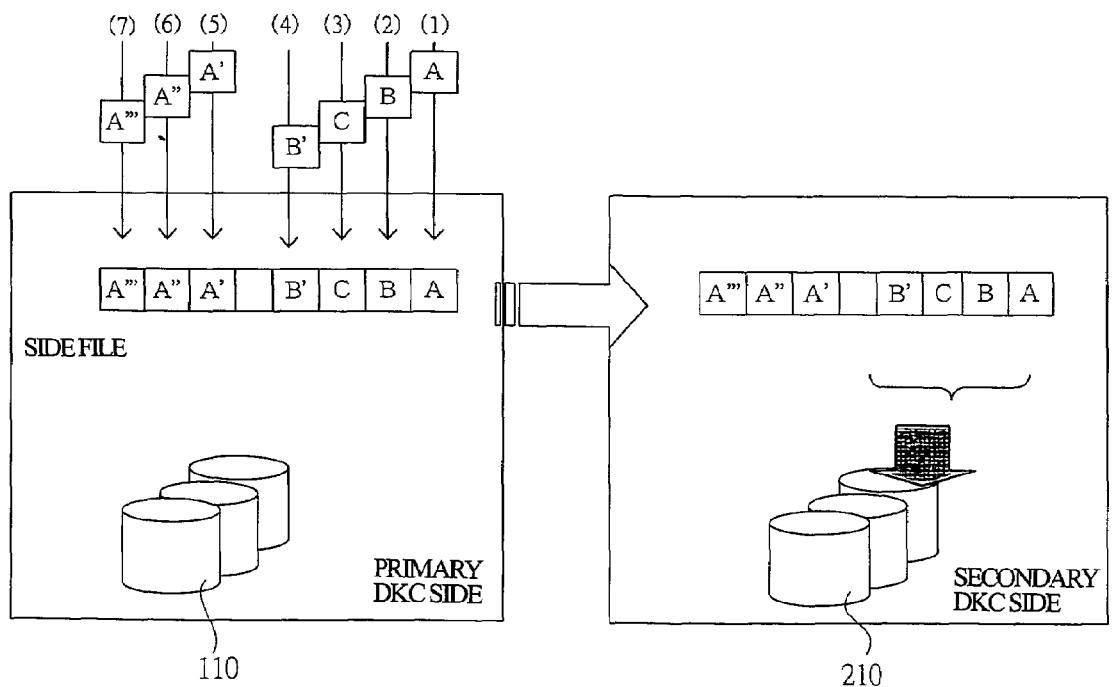

FIG. 17
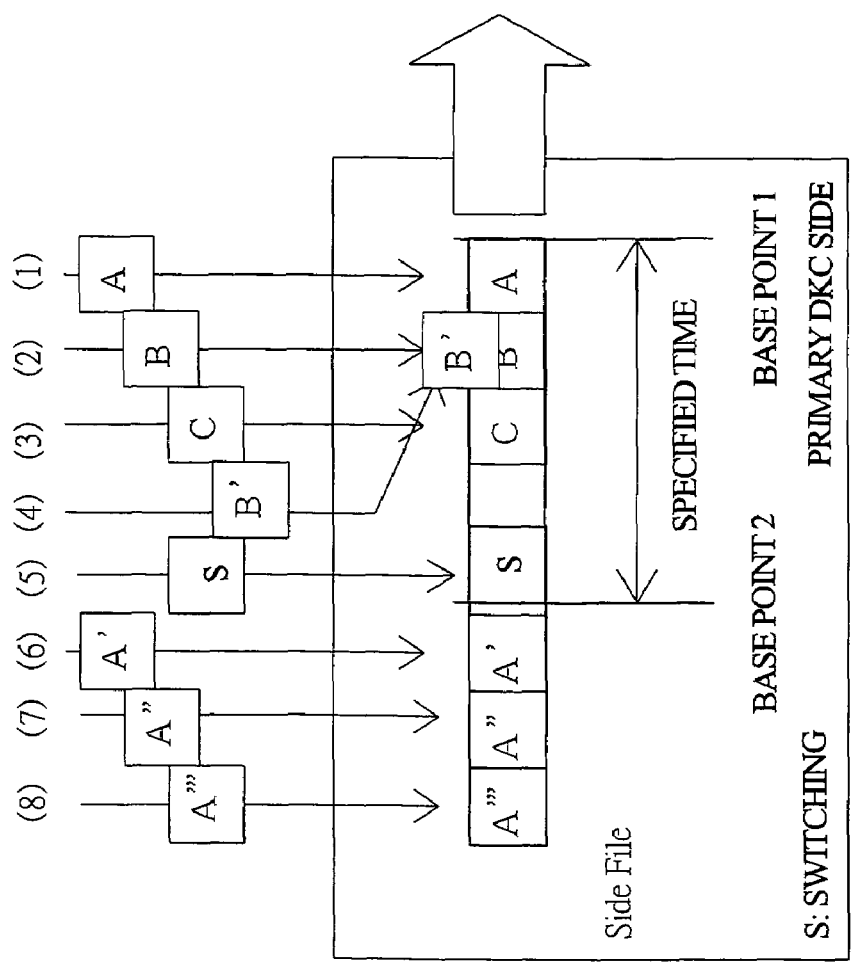
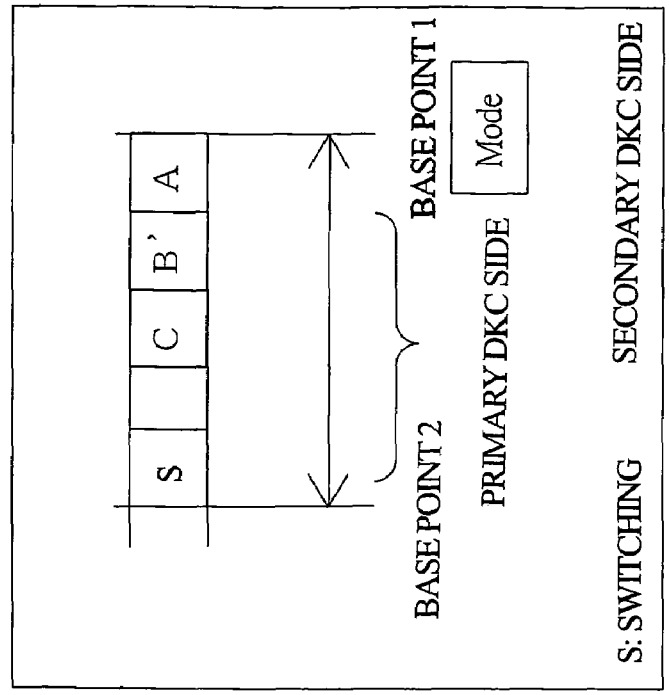

STORAGE APPARATUS FOR ASYNCHRONOUS REMOTE COPYING

CROSS-REFERENCE TO RELATED APPLICATION

This application is a Continuation application of U.S. application Ser. No. 10/848,150 filed May 19, 2004 now U.S. Pat. No. 7,171,517. Priority is claimed based on U.S. application Ser. No. 10/848,150 filed May 19, 2004, which claims the priority date of Japanese Patent Application No. 2004-085032 filed on Mar. 23, 2004, the content of which is hereby incorporated by reference into this application.

BACKGROUND OF THE INVENTION

The present invention relates to storage apparatuses for performing asynchronous remote copying between primary and secondary disk controllers. In particular, the present invention relates to techniques effective for adaptation to the transfer of update data.

Conventionally, when performing an asynchronous remote copying between a primary disk controller of a storage apparatus and a secondary disk controller thereof, by way of update data from the primary disk controller to the secondary disk controller, all write data to the primary disk controller are transferred.

Japanese Unexamined Patent Application Publication No. 2003-202962 discloses a storage controller proposed to achieve an object of minimizing performance deterioration even at an increased inter-controller distance. To achieve the object, after a termination notification of write data is returned from a primary disk controller, the write data is directly transmitted to a secondary disk controller, and the secondary disk controller stores the received data into a nonvolatile memory, whereby data securement is performed. In addition, predetermined reference time is set to enable all write data occurring before the reference time to be secured and to enable all data occurring after the time to be abandoned.

SUMMARY OF THE INVENTION

The conventional storage apparatus, however, has problems as described hereunder. In the remote copying, when update data to be transferred to the secondary disk controller from the primary disk controller, write data to the primary disk controller are all transferred as update data. For this reason, in an access pattern in which data are repeatedly overwritten on a same record, transfer data increases, thereby causing problems such as I/O delay.

The apparatus disclosed in Japanese Unexamined Patent Application Publication No. 2003-202962 has similar problems. That is, write data to the primary disk controller is transferred to the secondary disk controller and stored in the nonvolatile memory of the secondary disk controller. As such, in an access pattern in which data are repeatedly overwritten on a same record, the transfer data increases, thereby causing problems such as I/O delay.

An object of the present invention is to provide a storage apparatus in which the data amount of transfer data to a secondary disk controller from a primary disk controller at the event of remote copying can be reduced, and data integrity also can be assured.

In addition, another object of the present invention is to provide a storage apparatus in which a detection of a midpoint at the event of assurance of data integrity can easily be detected through a secondary disk controller.

A storage apparatus according to the present invention has a primary disk controller including a cache memory and a control memory and connected to a host computer; a disk device connected to the primary disk controller; a secondary disk controller including a cache memory and a control memory; and a disk device connected to the secondary disk controller, wherein the cache memory of the primary disk controller has a first area for storing update data that are to be written to the disk device, and a second area for storing update data that are to be transferred to the secondary disk controller; the primary disk controller provides timestamps and acceptance numbers to update data sent from the host computer so as to be stored into the second area of the cache memory as update data that are to be transferred to the secondary disk controller, transfers the stored update data to the secondary disk controller, and performs remote copying to the secondary disk controller. The storage apparatus comprises in the primary disk controller, overwriting update data in same records during a specified time between a preset first base point and a preset second base point on the update data that are stored in the second area of the cache memory and that are to be transferred to the secondary disk controller; and in the secondary disk controller, handling the update data between the first base point and the second base point as real data having consistency.

Further, in the storage apparatus according to the present invention, a mode for overwriting and a mode for not overwriting update data in a same record on update data stored in the cache memory of the primary disk controller are provided; upon acceptance of a mode switching instruction from the host computer, mode switching information is stored into the cache memory of the primary disk controller; the mode switching information is transferred to the secondary disk controller; and in the secondary disk controller, an operation mode is changed in accordance with the mode switching information transferred from the primary disk controller.

BRIEF DESCRIPTIONS OF THE DRAWINGS

FIG. 2 is a view showing write-data management information of the storage apparatus according to the first embodiment of the present invention;

FIG. 3 is an explanatory view for explaining a general write-data transfer operation;

FIG. 17 is an explanatory view for explaining a mode switching operation of the storage apparatus, according to a fifth embodiment of the present invention;

DESCRIPTION OF THE PREFERRED EMBODIMENTS

Referring to the accompanying drawings, embodiments of the present invention will be described hereafter in detail. In general, in all the drawings to be referred to in the description of the embodiments, same or like portions and members are shown by same numerals/symbols, and repeated descriptions thereof will be omitted.

First Embodiment

<Configuration of Storage Device>

Figure 1:
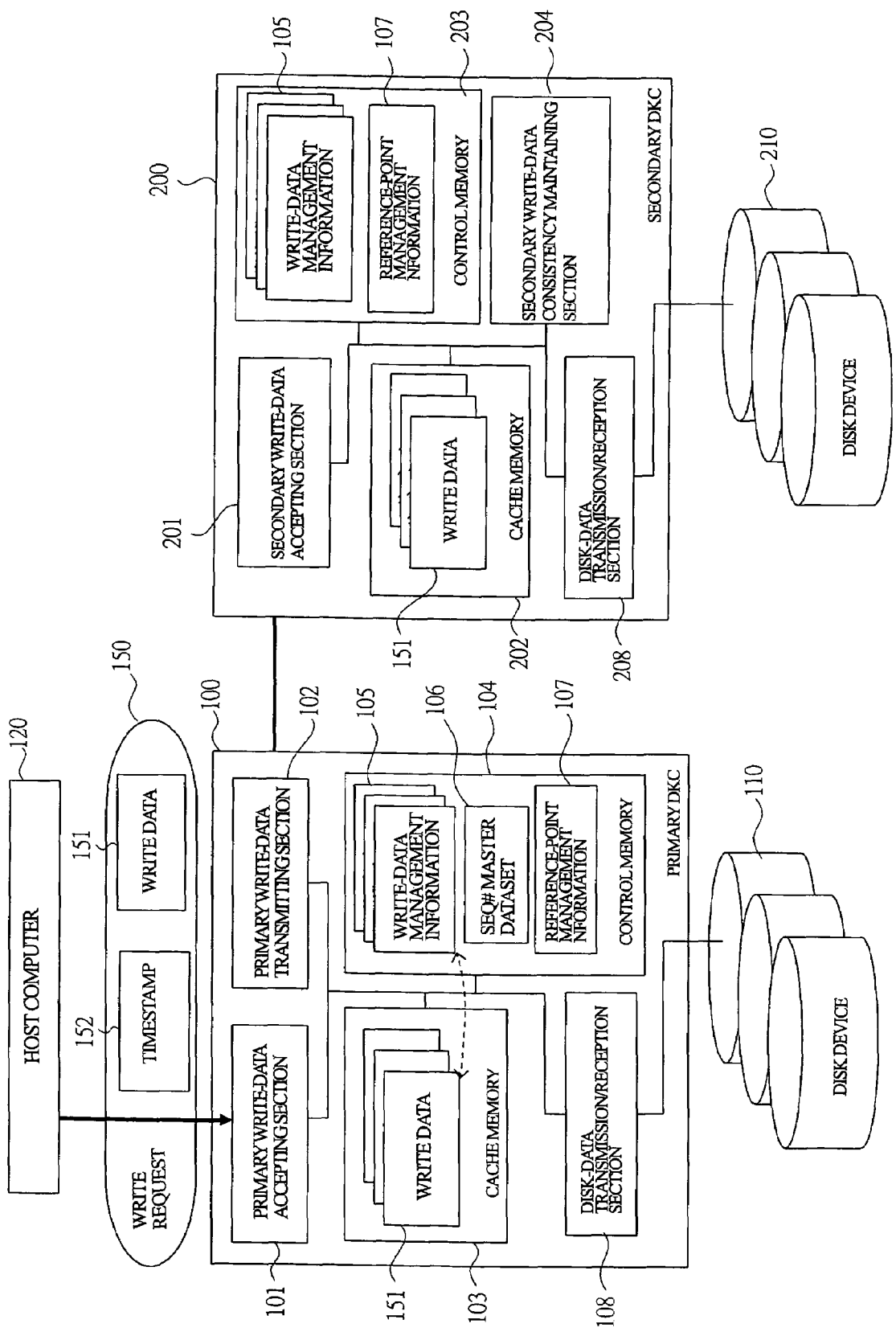
FIG. 1 is a configuration view showing the configuration of a storage apparatus according to a first embodiment of the present invention.

With reference to FIG. 1, the configuration of a storage apparatus according to a first embodiment will be described hereunder. FIG. 1 is a configuration view showing the configuration of a storage apparatus according to a first embodiment of the present invention.

Referring to FIG. 1, the storage apparatus is configured of a primary disk controller 100 (which hereafter will be referred to as a "primary DKC") to which a host computer 120 is connected, a disk device(s) 110 connected to the primary DKC 100, a secondary disk controller 200 (which hereafter will be referred to as "secondary DKC"), and a disk device(s) 210 connected to the secondary DKC 200.

The primary DKC 100 includes a primary write-data accepting section 101, a primary write-data transmitting section 102, a cache memory 103, a control memory 104, and a disk-data transmitting/receiving section 108.

The cache memory 103 stores write data 151 sent from the host computer 120 and received by a primary write-data accepting section 101. The write data 151 thus stored in the cache memory 103 is then written to the disk device 110.

The control memory 104 stores write-data management information 105 used to manage the write data 151; SEQ# master dataset 106 used to manage acceptance numbers (SEQ#) of write data 151; and base-point management information 107 used to manage base points between the DKC 100 and the secondary DKC 200.

The disk-data transmitting/receiving section 108 performs data transmission/reception in communication with disk device 110.

Buses and switches, for example, connect the primary write-data accepting section 101, the primary write-data transmitting section 102, the cache memory 103, the control memory 104, and the disk-data transmitting/receiving section 108.

The secondary DKC 200 includes a secondary write-data accepting section 201, a cache memory 202, a control memory 203, a secondary write-data consistency maintaining section 204, and a disk-data transmitting/receiving section 208.

The cache memory 202 stores write data 151 sent from the primary write-data transmitting section 102 of the primary DKC 100 and received by a secondary write-data accepting section 201. The write data 151 thus stored in the cache memory 202 is then secondary write-data accepting section 201.

The control memory 203 stores write-data management information 105 used to manage the write data 151, and base-point management information 107 used to manage the base points between the DKC 100 and the secondary DKC 200.

The disk-data transmitting/receiving section 208 performs data transmission/reception in communication with disk device 210.

Buses and switches, for example, connect the secondary write-data accepting section 201, the cache memory 202, the control memory 203, the secondary write-data consistency maintaining section 204, and the disk-data transmitting/receiving section 208.

In the present embodiment, the storage apparatus described above performs remote copying for data integrity per an update record unit between the primary DKC 100 and the secondary DKC 200.

<Write-Data Management Information>

Referring to FIG. 2, the write-data management information 105 to be stored into the control memory 104 and 203 will be described below. FIG. 2 is a view showing an example of write-data management information.

Referring to FIG. 2, the write-data management information 105 is created corresponding to write data 151, and is comprised of a disk device address 130, a write address 131, a write time 132, an acceptance number 133, a write data pointer 134, and a transfer necessity bit 135.

The disk device address 130 and the write address 131 are information that specifies the positions of write data in the disk devices 110 and 210 and that is provided as instructions with a write request 150 to be sent from the host computer 120.

Information of the write time 132 is provided in the write request 150 as a timestamp 152 ("T/S") representing the write time to the write data 151 from the host computer 120. In a case where the timestamp 152 is not provided from the host computer 120, a timer in the primary DKC 100 is provided by the primary DKC 100.

The acceptance number 133 is information that the SEQ# master dataset 106 provides to write data 151 in the sequence of accepted write data 151 by referencing the SEQ# master dataset 106.

The write data pointer 134 is information of a pointer to corresponding write data 151.

Together with write data 151, these items of information are stored to the cache memories 103 and 202 and used to for various operations such as write of write data 151 to the disk devices 110 and 210, transfer of write data 151 from the primary DKC 100 to the secondary DKC 200, re-ordering of items of write data 151, and checking for occurrence of omission of write data 151 in the secondary DKC 200.

The transfer necessity bit 135 represents information indicating whether write data 151 is required to be transferred from the primary DKC 100 to the secondary DKC 200. More specifically, for example, in the event that the transfer necessity bit 135 is "ON", it is determined that write data 151 is required to be transferred from the primary DKC 100 to the secondary DKC 200, and the write request 150 is transferred from the primary DKC 100 to the secondary DKC 200. Then, after completion of the transfer, the transfer necessity bit 135 corresponding to the write data 151, the transfer necessity bit 135 is turned "OFF".

<Transfer Operation for Data from Primary DKC to Secondary DKC>

Figure 4:
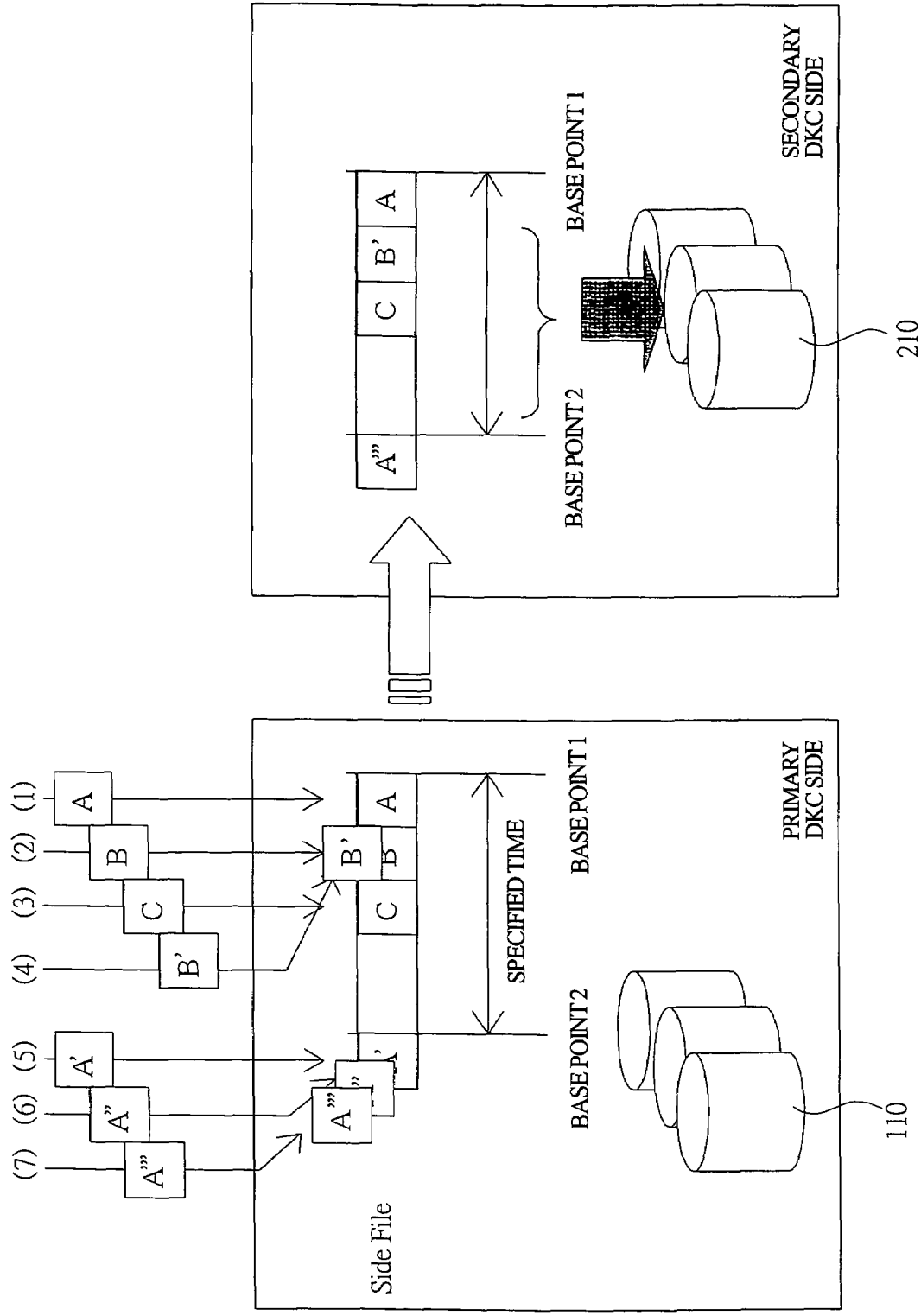
FIG. 4 is an explanatory view for explaining a write-data transfer operation of the storage apparatus according to the first embodiment of the present invention.
Figure 5:
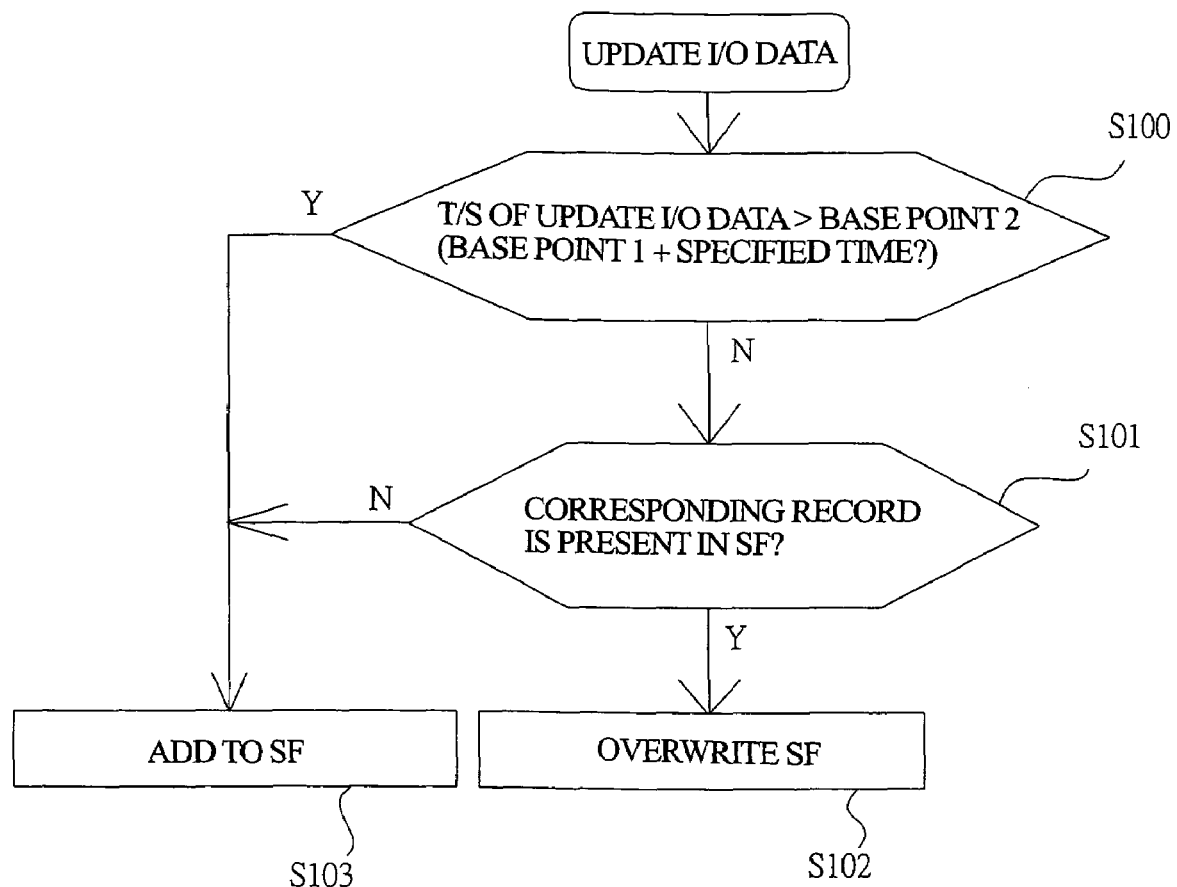
FIG. 5 is a flowchart showing the operation of storing write data on the side of a primary DKC (which stands for "disk controller") of the storage apparatus into a cache memory, according to the first embodiment of the present invention.
Figure 6:
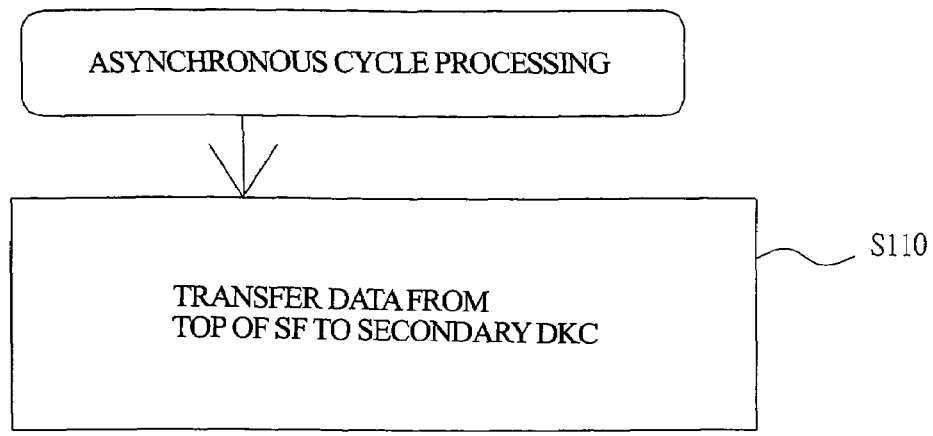
FIG. 6 is a flowchart showing the operation of asynchronous cycle processing on the side of the primary DKC of the storage apparatus according to the first embodiment of the present invention.
Figure 7:
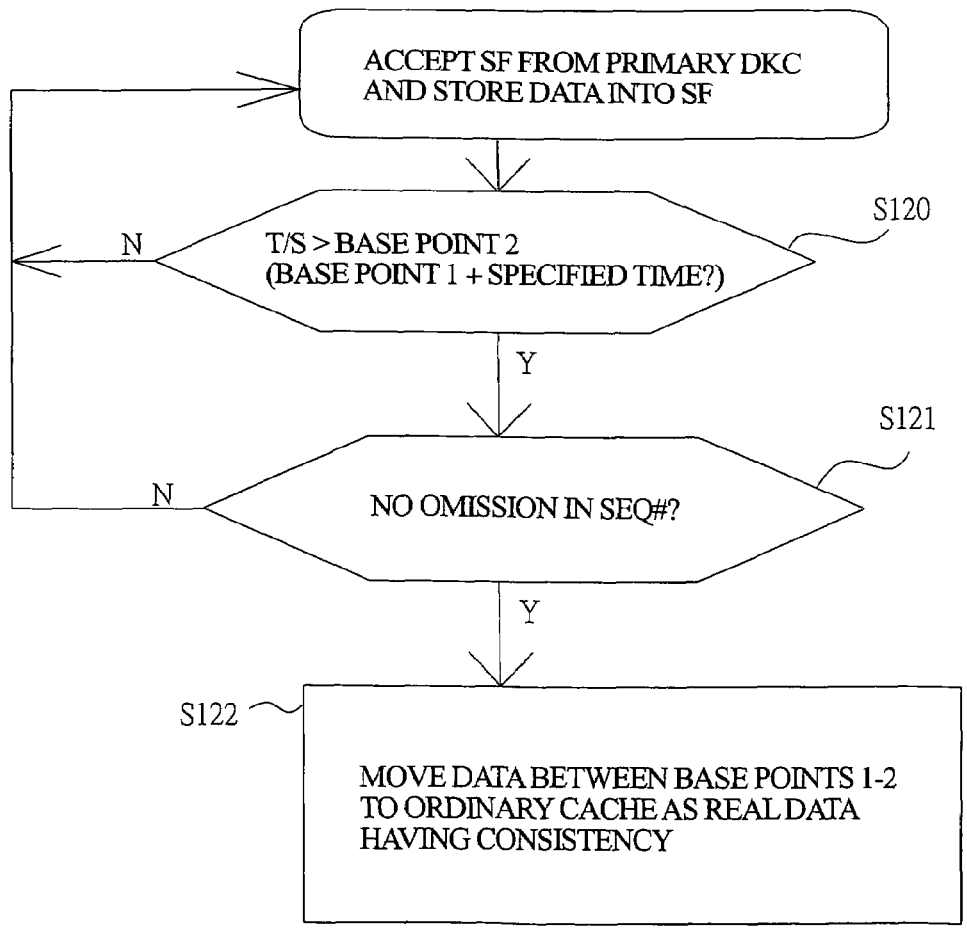
FIG. 7 is a flowchart showing the operation of storing write data on the side of a secondary DKC of the storage apparatus into a cache memory, according to the first embodiment of the present invention.

Transfer operation according to the first embodiment of the present invention for write data from the primary DKC 100 to the secondary DKC 200 will be described hereunder. FIG. 3 is an explanatory view for explaining a general write-data transfer operation. FIG. 4 is an explanatory view for explaining a write-data transfer operation of the storage apparatus according to the first embodiment of the present invention. FIG. 5 is a flowchart showing the operation of storing write data on the side of the primary DKC into the cache memory. FIG. 6 is a flowchart showing the operation of asynchronous cycle processing on the side of the primary DKC. FIG. 7 is a flowchart showing the operation of storing write data on the side of the secondary DKC into the cache memory.

First, general write-data transfer operation will be described before describing the write-data transfer operation from the primary DKC to the secondary DKC according to the present embodiment.

According to the general write-data transfer operation, as shown in FIG. 3, on the side of the primary DKC 100, separately from data to be written to the disk device 110, timestamps 152 provided by the host computer 120 for update I/O data ((1), (2), (3), (4), (5), (6), and (7) shown in FIG. 3) and acceptance numbers 133 provided by the primary DKC 100 are stored together with write data 151 of update data into the cache memory 103 as update data (which hereafter will be referred to as a "Side File") to be transferred to the secondary DKC 200, and the update I/O data are completed before the data is transferred to the secondary DKC 200. Thereafter, the primary DKC 100 transfers the Side File asynchronously with the host I/O.

In the secondary DKC 200, the data from the accepted Side File are sorted into a time series order on the basis of the write time 132 and the acceptance number 133, and data consistency of the data to a midpoint (for example, to B' on the side of secondary DKC shown in FIG. 3) are assured.

In this operation, even in an access pattern (such as A, A', and A''') which is repeatedly overwritten on a same record in the primary DKC 100, all the data are stored as update I/O data into the Side File and transferred to the secondary DKC 200.

Referring to FIG. 4, in the present embodiment, during a specified time from a base point 1 to a base point 2, the same record can be overwritten on a data record, which is not yet transferred to the secondary DKC 200, in a Side File in the cache memory 103 of the primary DKC 100 (in FIG. 4, for example, the update data B' can be overwritten on the record B).

In the configuration thus arranged to enable overwriting on records in the Side File in the predetermined time, reduction in the amount of transfer data and reduction in processing overhead can be implemented.

In the primary DKC 100, while the Side Files can be sequentially transferred to the secondary DKC 200, overwriting is performed when update I/O data for a record in untransferred records in the Side File is present. The Side File received in the secondary DKC 200 is preserved in the cache memory 202 during a specified time, and upon acceptance of all data during the specified time, the Side File is then handled as real data.

The base points in the primary DKC 100 and the secondary DKC 200 are defined in an initial operation of creating a remote pair between the primary DKC 100 and the secondary DKC 200.

By way of operation on the side of the primary DKC 100, as shown in FIG. 5, first, if update I/O data from the host computer 120 is present, it is determined whether a timestamp 152 of the update I/O data is greater than a current base point 2 (base point 1+specified time) (in S100 ("S"=step)). If in S100 the operation the timestamp 152 is determined greater, since the time is not within the specified time, update data in the update I/O data is added to the Side File (in S103). If in S100 the timestamp 152 is determined less than or equal to the base point 2, it is determined that whether a record corresponding to the update I/O data is present in the Side File (in S101).

If in S101 it is determined that no update I/O is present in the Side File, since no record for overwriting is present therein, the operation adds update data in the update I/O data to the Side File (in S103). If in S101 it is determined that a record corresponding to the update I/O data is present in the Side File, the update data in the update I/O data is overwritten on the data in the record in the Side File (in S102).

Then, in the primary DKC 100 side, as shown in FIG. 6, by way of asynchronous cycle processing, transfer processing to the secondary DKC 200 is performed for the data from the top of the Side File (in S110).

By way of operation in the secondary DKC 200 side, as shown in FIG. 7, the Side File is accepted from the primary DKC 100 and stored as a Side File to be processed in the secondary DKC 200 side. Thereafter, it is determined whether the timestamp 152 is greater than a current base point 2 (base point 1+specified time) (in S120). In this case, the Side Files are continually accepted from the primary DKC 100 until S120 determines the timestamp 152 to be greater than the base point 2. If S120 determines the timestamp 152 to be greater than the base point 2, the operation then determines whether an omission is present in acceptance numbers 133 for update data in the time from the base point 1 to the base point 2 (in S121).

If in S121 it is determined that an omission is present in the acceptance numbers 133, since all update data in the time from the base point 1 to the base point 2 are not accepted from the primary DKC 100, the Side File is again accepted from the primary DKC 100 and stored as a Side File to be processed in the secondary DKC 200.

If in S121 it is determined that no omission is present in the acceptance numbers 133, data in the time from the base point 1 to the base point 2 are moved as real data having consistency to an ordinary cache in the cache memory 202 (in S122). Thereafter, the data in the ordinary cache are written to the disk device 210, whereby the data becomes real data having consistency.

<Verification Operation for Acceptance Numbers>

Figure 8:
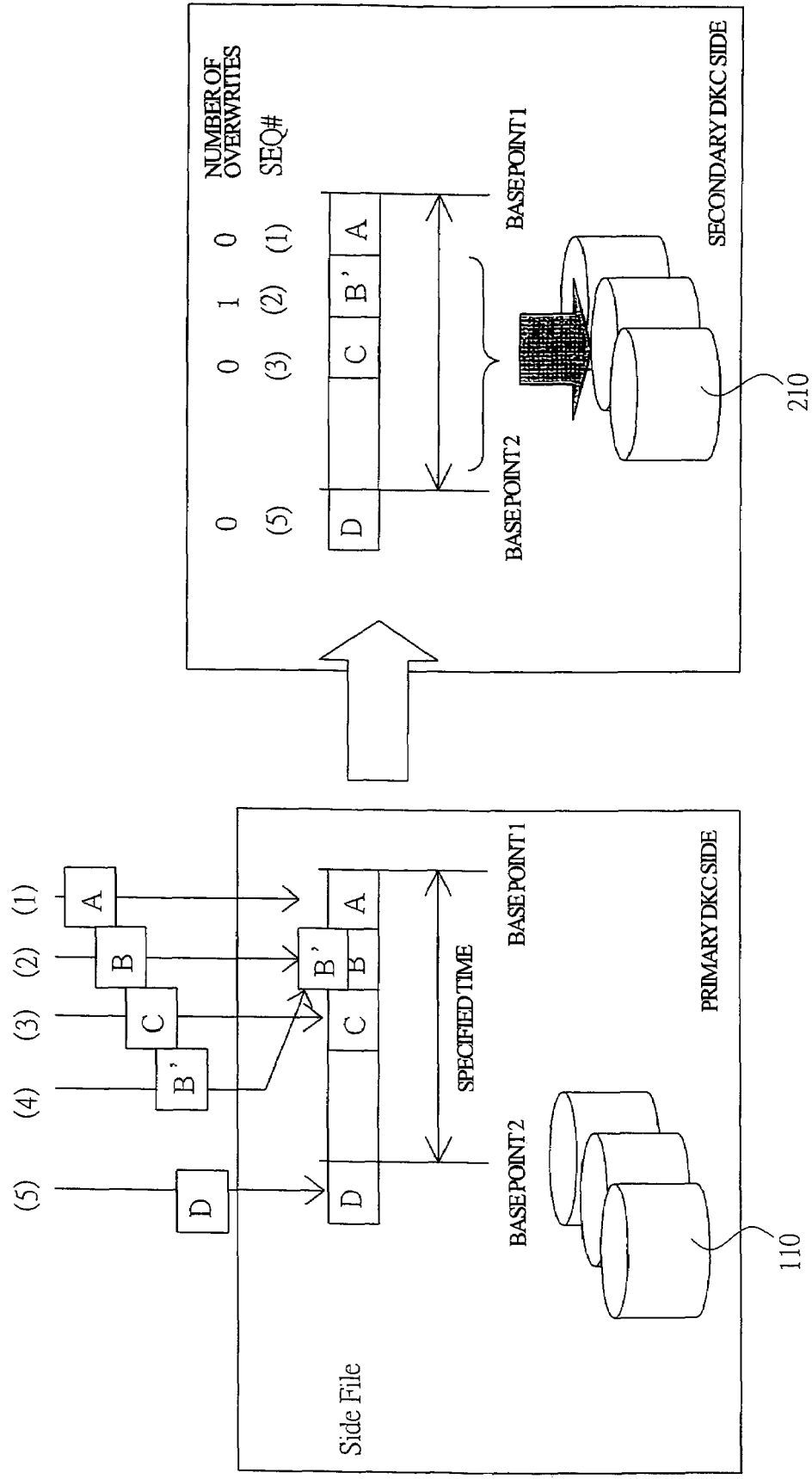
FIG. 8 is an explanatory view for explaining a verification operation for an acceptance number of the storage apparatus according to the first embodiment of the present invention.

With reference to FIG. 8, the verification operation for the acceptance numbers 133 in S121 in FIG. 7 will be described hereunder. FIG. 8 is an explanatory view for explaining the verification operation the reception numbers.

When a same record in the Side File in the cache memory 103 of the primary DKC 100 is overwritten with update data, it is difficult to determine whether all the Side Files have been accepted on the side of the secondary DKC 200.

Then, in the present embodiment, by way of management information for the Side File, information of the number of overwrites on records is provided in addition to the timestamp 152 and the acceptance number 133.

For example, in an example shown in FIG. 8, of update I/O data ((1), (2), (3), (4), and (5) in FIG. 8) from the host computer 120, since update I/O data (B') shown by (4) is the same record as a record B, update data in B' is overwritten on the record B. At this event, the acceptance number 133 of the record B is not that of B', the acceptance number of the record B is maintained, and "1" is added as information of number of overwrites on the record B.

On the side of the secondary DKC 200, when verifying the number of arrived records (which is three in the example shown in FIG. 8) during the specified time from the base point 1 to the base point 2 in accordance with the acceptance numbers 133, the information of the number of overwrites (which is one in the example shown in FIG. 8) is referenced, and a comparison is made with a first acceptance number 133 of the Side File in the next specified time (which is "5" in the example shown in FIG. 8). Thereby, it can be verified whether all the Side Files have been accepted. That is, the number of arrived records in the event that update data is not overwriting data can be verified in accordance with the information obtained by adding together the information of the number of arrived records, which is obtained according to the acceptance numbers 133, and the information of the number of overwrites on individual records. Accordingly, in accordance with the number of arrived records and the first acceptance number 133 of the Side File in the next specified time, it can be verified whether all the Side Files have been accepted.

In the present embodiment, overwriting is performed in the specified time from the base point 1 to the base point 2 to same records of data, which are un-transferred to the secondary DKC 200 and which are present in the Side File in the cache memory 103 of the primary DKC 100. Accordingly, when performing asynchronous remote copying with data integrity being maintained in time series in units of an update record, even in the case of overwrite I/O data on same records, while the data integrity is being assured, reduction in the amount of transfer data and reduction in processing overhead can be implemented.

By way of example, suppose that a 1,000 iops (input/output operations per second) of updates are made from the host computer 120 for a same record of 4 KB/record. In this case, a transfer of 4 MB data (4 KB/record×1,000 iops=4 MB) is conventionally required; however, according to the present embodiment, the data amount can be reduced to 4 KB maximum.

Second Embodiment

In this embodiment, in lieu of the base points 1 and base points 2 that are managed by both the primary DKC 100 and the secondary DKC 200 in the first embodiment, a synchronization point representing a timing with which overwriting is terminated is transferred from the primary DKC 100 to the secondary DKC 200, and base-point management is not performed in the secondary DKC 200.

The storage apparatus of the present embodiment has the same configuration as the first embodiment.

<Transfer Operation for Write Data from Primary DKC to Secondary DKC>

Figure 9:
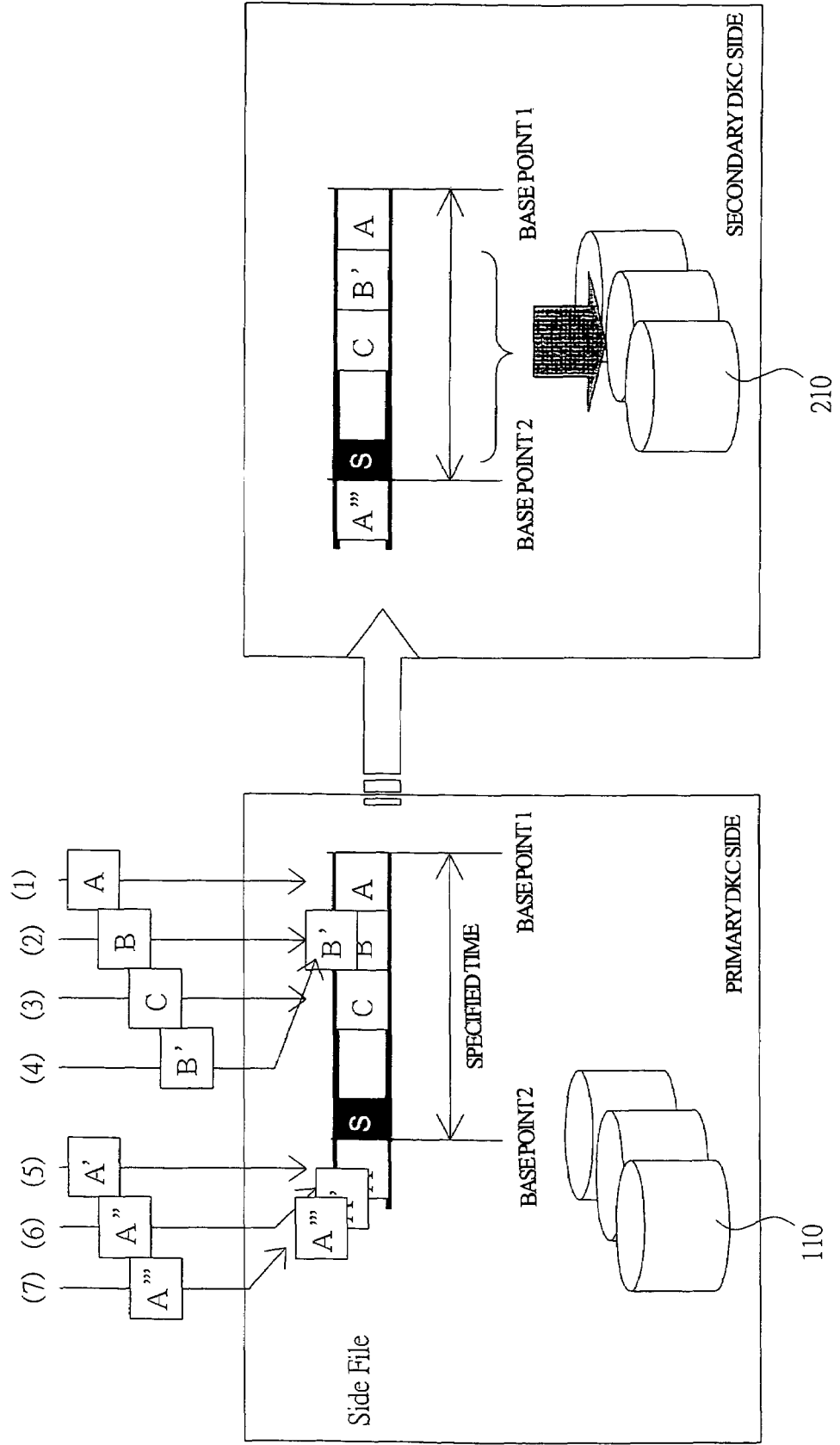
FIG. 9 is an explanatory view for explaining a write-data transfer operation of the storage apparatus according to a second embodiment of the present invention.
Figure 10:
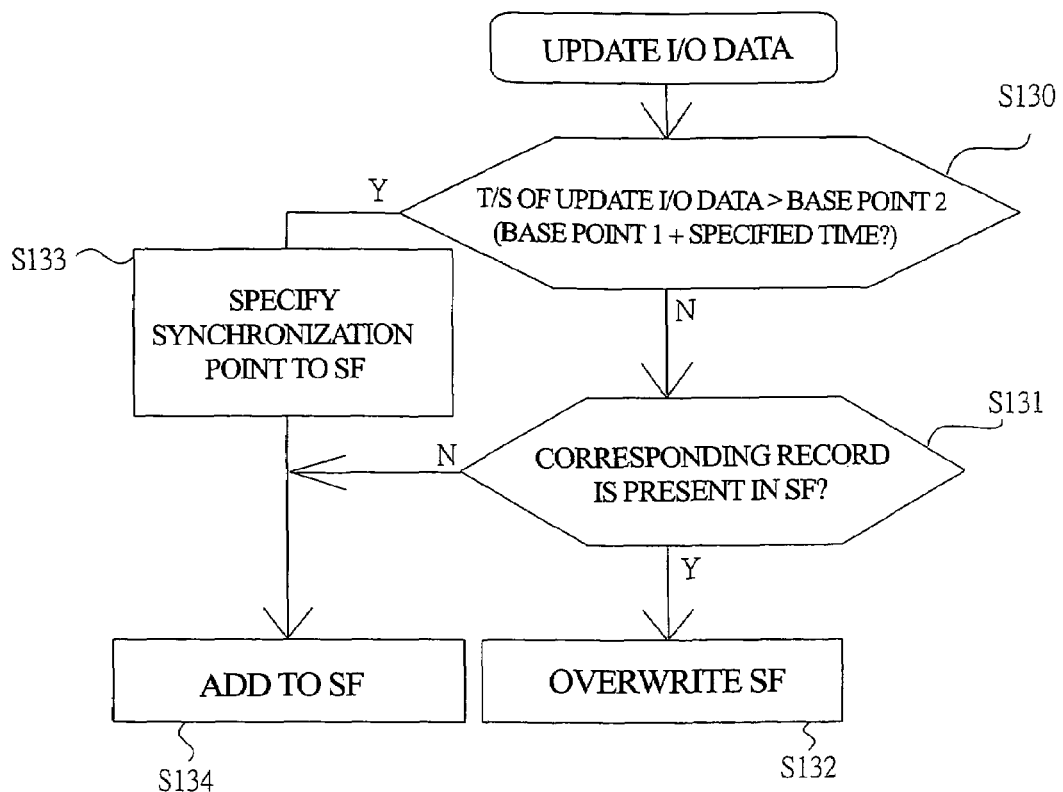
FIG. 10 is a flowchart showing the operation of storing write data on the side of the primary DKC of the storage apparatus into the cache memory, according to the second embodiment of the present invention.
Figure 11:
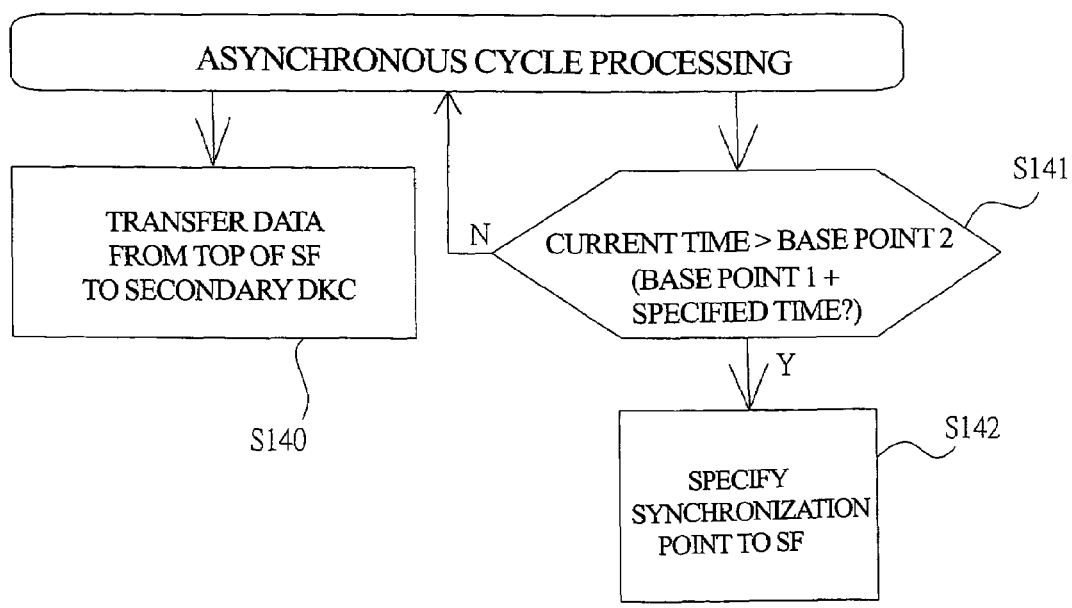
FIG. 11 is a flowchart showing the operation of asynchronous cycle processing on the side of the primary DKC of the storage apparatus according to the second embodiment of the present invention.
Figure 12:
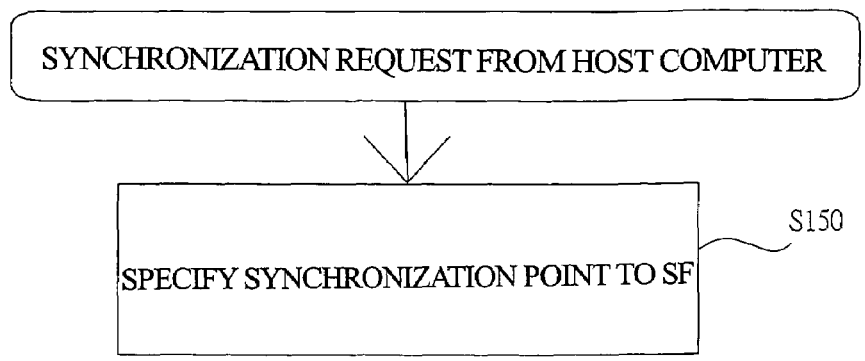
FIG. 12 is a flowchart showing the operation of a synchronization point specification from a host computer of the storage apparatus according to the second embodiment of the present invention.
Figure 13:
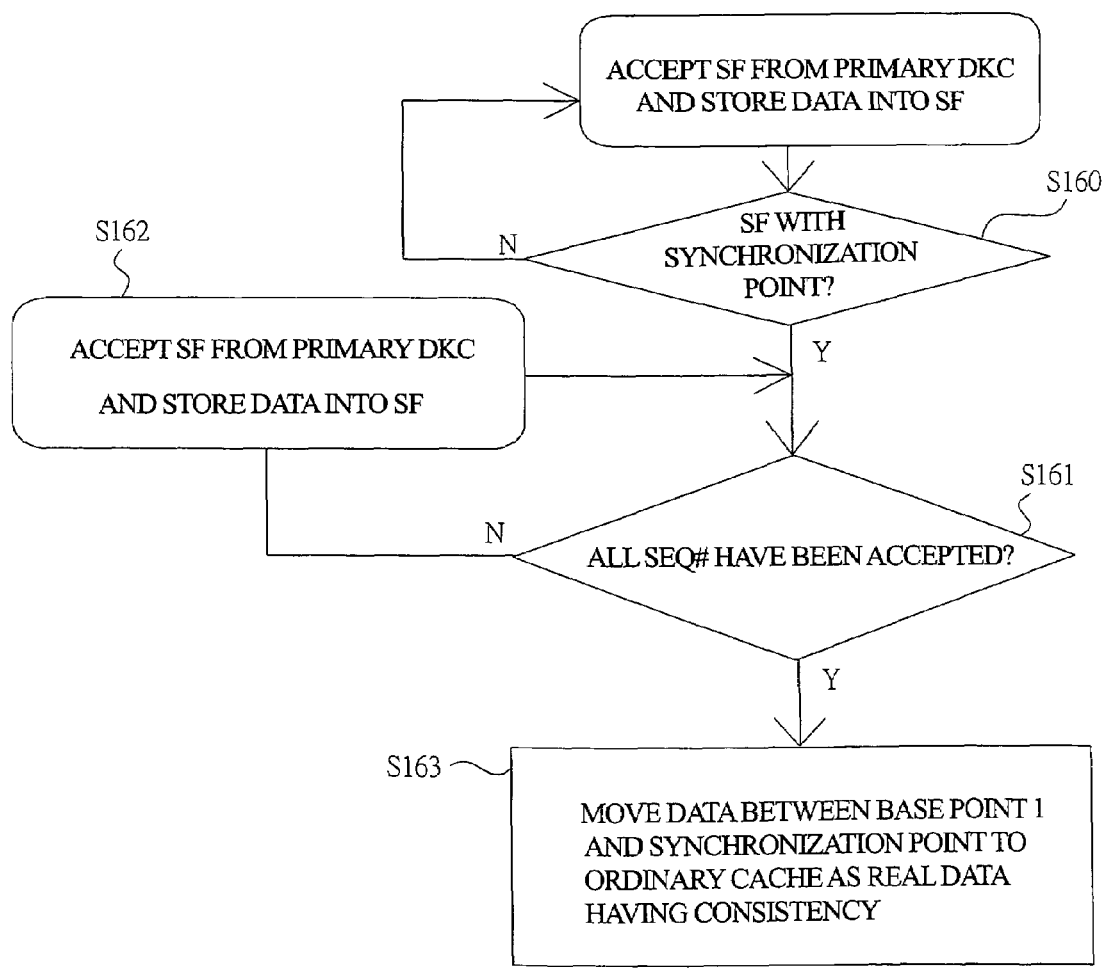
FIG. 13 is a flowchart showing the operation of storing write data on the side of the secondary DKC of the storage apparatus into the cache memory, according to the second embodiment of the present invention.

Transfer operation according to the second embodiment of the present invention for write data from the primary DKC 100 to the secondary DKC 200 will be described hereunder. FIG. 9 is an explanatory view for explaining a write-data transfer operation of the storage apparatus according to the second embodiment of the present invention. FIG. 10 is a flowchart showing the operation of storing write data on the side of the primary DKC into the cache memory. FIG. 11 is a flowchart showing the operation of asynchronous cycle processing on the side of the primary DKC. FIG. 12 is a flowchart showing the operation of synchronization point instruction from the host computer. FIG. 13 is a flowchart showing the operation of storing write data on the side of the secondary DKC into the cache memory.

With reference to FIG. 9, in the present invention, in the time from the base point 1 to a synchronization point (record S in FIG. 9), the same record can be overwritten on a data record, which is not yet transferred to the secondary DKC 200, in a Side File in the cache memory 103 of the primary DKC 100 (in FIG. 9, for example, the update data B' can be overwritten on the record B).

In the configuration thus arranged to enable overwriting on records in the Side File in the predetermined time, reduction in the amount of transfer data and reduction in processing overhead can be implemented.

In the primary DKC 100, while the Side Files can be sequentially transferred to the secondary DKC 200, overwriting is performed when update I/O data for a record in un-transferred records in the Side File is present. The Side File received in the secondary DKC 200 is preserved in the cache memory 202 until the synchronization point is transferred, and upon acceptance of all data in the time until the synchronization point is transferred, the Side File is then handled as real data.

The base points 1 in the primary DKC 100 and the secondary DKC 200 are defined in an initial operation of creating a remote pair between the primary DKC 100 and the secondary DKC 200. Thereafter, in the primary DKC 100, the base point 2 is managed according to a specified time similar to that in the first embodiment, whereby the synchronization point near the base point 2 is transferred to the secondary DKC 200. In addition, a synchronization point can be arbitrarily designated from the host computer 120, whereby a user is enabled to arbitrarily control synchronization of asynchronous copy operation.

By way of operation on the side of the primary DKC 100, as shown in FIG. 10, first, if update I/O data from the host computer 120 is present, it is determined whether a timestamp 152 of the update I/O data is greater than a current base point 2 (base point 1+specified time) (in S130). If in S130 the timestamp 152 is determined greater, a synchronization point is specified to the Side File (in S133), and update data in the update I/O data is added to the Side File (in S134). If in S134 the timestamp 152 is determined less than or equal to the base point 2, it is determined whether a record corresponding to the update I/O data is present in the Side File (in S131).

If in S131 it is determined that no update I/O is present in the Side File, since no record for overwriting is present therein, the operation adds update data in the update I/O data to the Side File (in S134). When it is determined in S131 that a record corresponding to the update I/O data is present in the Side File, the update data in the update I/O data is overwritten on the data in the record in the Side File (in S132).

Then, in the primary DKC 100 side, as shown in FIG. 11, by way of asynchronous cycle, data transfer processing to the secondary DKC 200 is performed for the data from the top of the Side File (in S140). In addition, by way of the asynchronous cycle processing, it is determined whether a current time is greater than a current base point 2 (base point 1+specified time) (in S141). If the current time is greater than the current base point 2 (base point 1+specified time), a synchronization point is specified to the Side File (in S142).

The specifications in S133 shown in FIG. 10 and in S142 shown in FIG. 11 are each operated near the time of the base point 2 being managed in the primary DKC 100. According to any of the specifications, the synchronization point is specified; and after the specification of the synchronization point, the specified point is managed as the base point 1, thereby preventing double synchronization points from being specified.

By way of operation when a synchronization request is accepted from the host computer 120, upon acceptance of a synchronization request from the host computer 120, a synchronization point is specified to the Side File at that time (in S150).

By way of operation in the secondary DKC 200 side, as shown in FIG. 13, the Side File is accepted from the primary DKC 100 and stored as a Side File to be processed in the secondary DKC 200 side. Then, it is determined whether the Side File is a Side File of a synchronization point (in S160). The Side Files are continually accepted from the primary DKC 100 until S160 determines a Side File to be a Side File of a synchronization point. If S160 determines a Side File to be a Side File of a synchronization point, the operation then determines whether the acceptance numbers 133 between the base point 1 to the synchronization point (in S161).

If in S161 it is determined that all the acceptance numbers 133 have not been received, the Side File is again accepted from the primary DKC 100 and stored as a Side File to be processed in the secondary DKC 200 (in S162).

If in S161 it is determined that all the acceptance numbers 133 have been accepted, data in the time from the base point 1 to the base point 2 are moved as real data having consistency to an ordinary cache in the cache memory 202 (in S163).

Thereafter, the data in the ordinary cache are written to the disk device 210, whereby the data becomes real data having consistency.

In the present embodiment, overwriting is performed during the specified time from the base point 1 to the base point 2 to same records of data, which are un-transferred to the secondary DKC 200 and which are present in the Side File in the cache memory 103 of the primary DKC 100. Accordingly, when performing asynchronous remote copying with data integrity being maintained in time series in units of an update record, even in the case of overwrite I/O data on same records, while the data integrity is being assured, reduction in the amount of transfer data and reduction in processing overhead can be implemented.

By way of example, suppose that a 1,000 iops of updates are made from the host computer 120 for a same record of 4 KB/record. In this case, a transfer of 4 MB data (4 KB/record×1,000 iops=4 MB) is conventionally required; however, according to the present embodiment, the data amount can be reduced to 4 KB maximum.

Further, in the secondary DKC 200, a midpoint can be detected only by detecting the synchronization point without managing base points, and a user is enabled to arbitrarily control the synchronization point from the host computer 120. For example, when a synchronization point is specified immediately after a commit to a DBMS (database management system), the commit can be verified to have arrived in the secondary DKC 200.

Third Embodiment

This embodiment is arranged such that update data are not asynchronously transferred from the primary DKC 100 to the secondary DKC 200 is not performed, and the Side File is not transferred during the specified time from the base point 1 to the base point 2; however, the Side Files are batch transferred to the secondary DKC 200 at a time point exceeding the specified time.

The storage apparatus of the present embodiment has the same configuration as the first embodiment.

<Transfer Operation for Write Data from Primary DKC to Secondary DKC>

Figure 14:
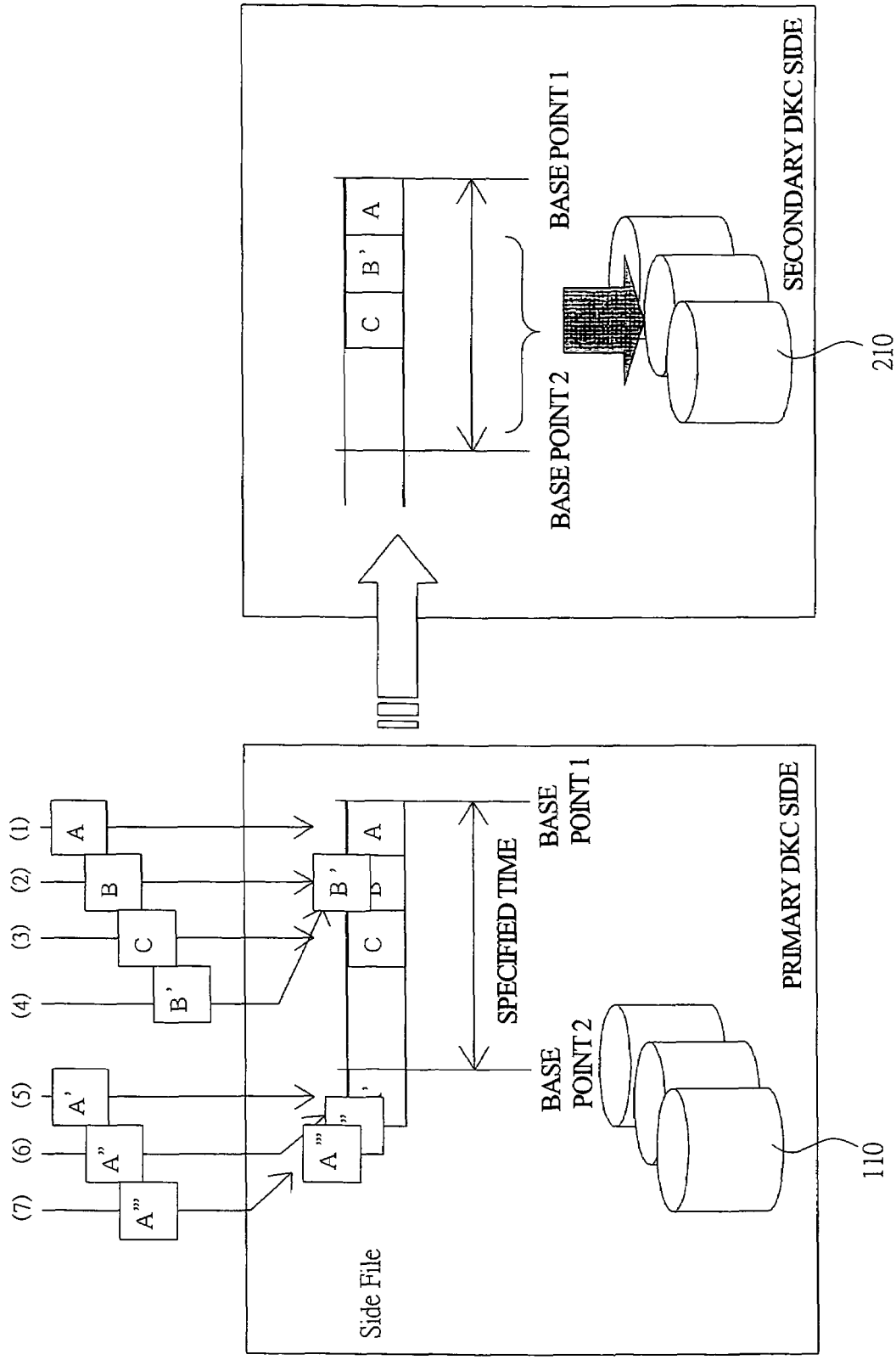
FIG. 14 is an explanatory view for explaining a write-data transfer operation of the storage apparatus according to a third embodiment of the present invention.
Figure 15:
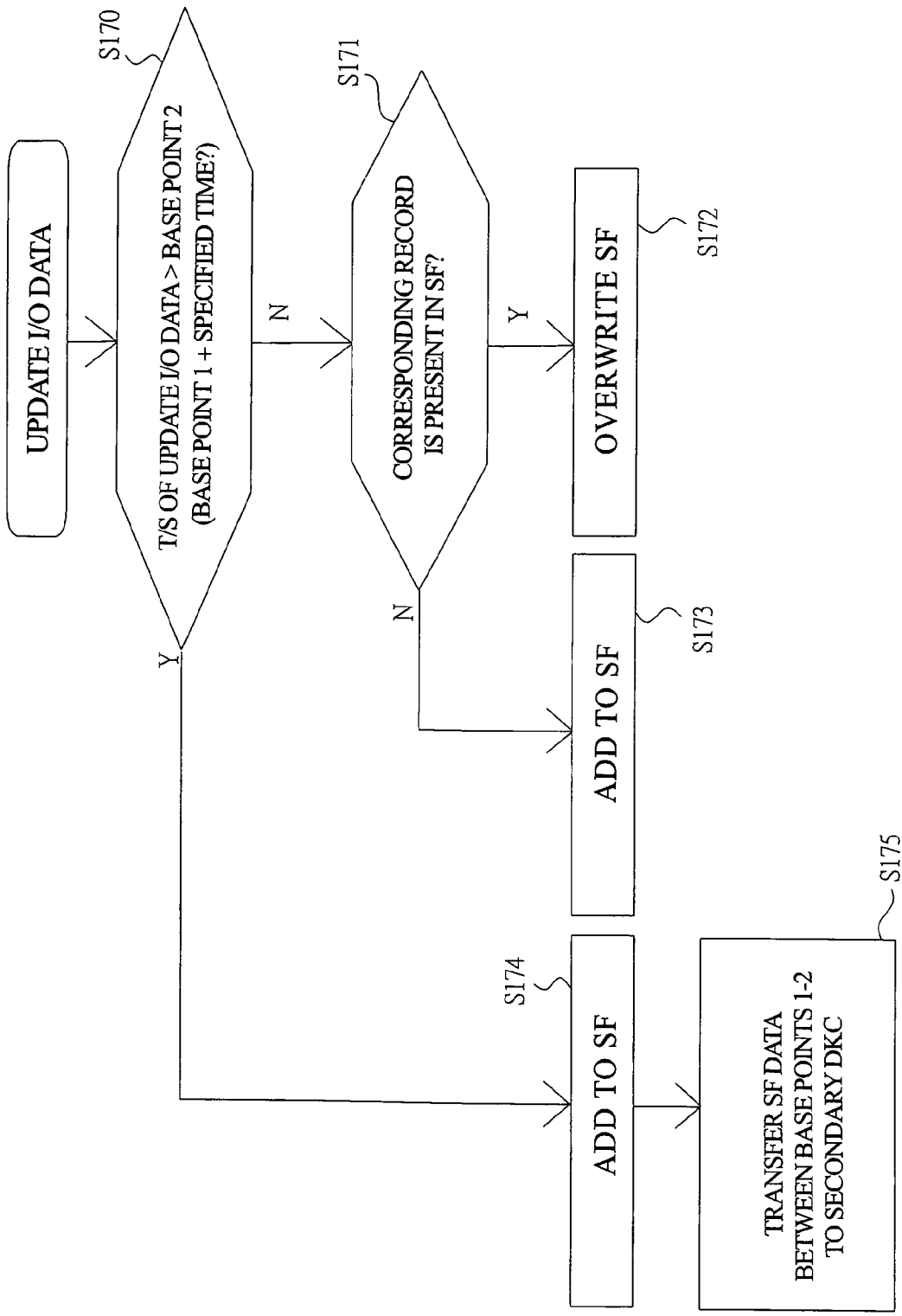
FIG. 15 is a flowchart showing the operation of storing write data on the side of the primary DKC of the storage apparatus into the cache memory and the data transfer operation according to the third embodiment of the present invention.
Figure 16:
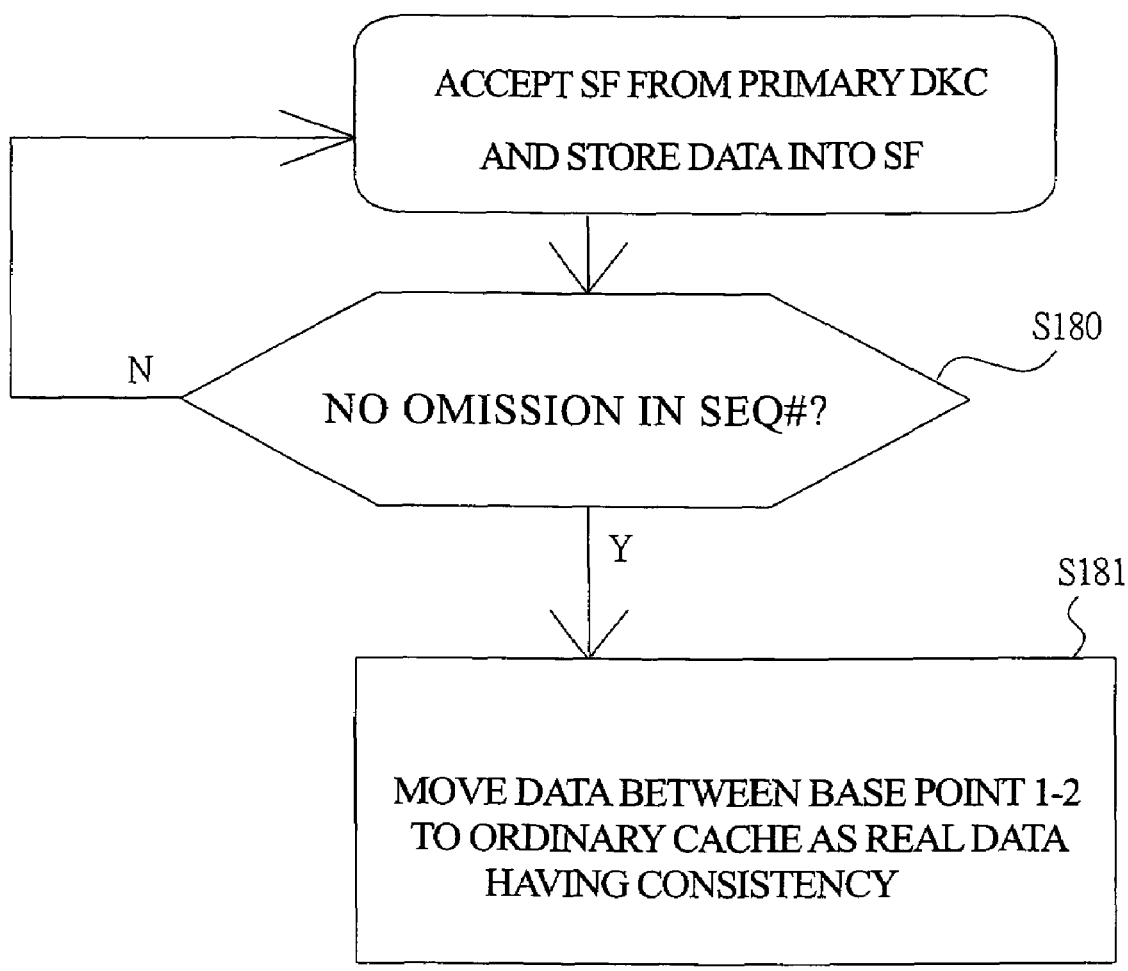
FIG. 16 is a flowchart showing the operation of storing write data on the side of the secondary DKC of the storage apparatus into the cache memory, according to the third embodiment of the present invention.

Transfer operation according to the third embodiment of the present invention for write data from the primary DKC 100 to the secondary DKC 200 of the storage apparatus will be described hereunder. FIG. 14 is an explanatory view for explaining a write-data transfer operation of the storage apparatus according to the third embodiment. FIG. 15 is a flowchart showing the operation of storing write data on the side of the primary DKC into the cache memory and the data transfer operation. FIG. 16 is a flowchart showing the operation of storing write data on the side of the secondary DKC into the cache memory.

With reference to FIG. 14, in the present invention, in the time from the base point 1 to the base point 2, the same record can be overwritten on a data record, which is not yet transferred to the secondary DKC 200, in a Side File in the cache memory 103 of the primary DKC 100 (in FIG. 14, for example, the update data B' can be overwritten on the record B).

In the configuration thus arranged to enable overwriting on records in the Side File in the predetermined time, reduction in the amount of transfer data and reduction in processing overhead can be implemented.

In the primary DKC 100, the Side File is not transferred to the secondary DKC 200 during the specified time from the base point 1 to the base point 2, but overwriting is performed when update I/O data for a record in un-transferred records in the Side File. The Side File received in the secondary DKC 200 is preserved in the cache memory 202 during a specified time, and upon acceptance of all data during the specified time, the Side File is then handled as real data.

The base points in the primary DKC 100 and the secondary DKC 200 are defined in an initial operation of creating a remote pair between the primary DKC 100 and the secondary DKC 200.

By way of operation on the side of the primary DKC 100, as shown in FIG. 15, first, if update I/O data from the host computer 120 is present, it is determined whether a timestamp 152 of the update I/O data is greater than a current base point 2 (base point 1+specified time) (in S170). If in S170 it is determined that the timestamp 152 is less than or equal to the base point 2, it is determined whether the record in the update I/O data is present in the Side Files (in S171).

If in S171 it is determined that no update I/O is present in the Side File, since no record to be overwritten is present therein, the operation adds update data in the update I/O data to the Side File (in S173). In S171 if it is determined that a record corresponding to the update I/O data is present in the Side File, and the update data in the update I/O data is overwritten on the data in the record in the Side File (in S172).

If in S170 it is determined that the timestamp 152 is greater than the base point 2, since the time is not within the specified time, update data in the update I/O data is added to the Side File (in S174), the Side Files in the time from the base point 1 to the base point 2 are batch transferred to the secondary DKC 200 (in S175).

In the secondary DKC 200 side, as shown in FIG. 16, the Side File in the time from the base point 1 to the base point 2 is accepted and stored as a Side File to be processed in the secondary DKC 200, and thereafter, it is determined whether an omission is present in acceptance numbers 133 for update data in the time from the base point 1 to the base point 2 (in S180).

If in S180 it is determined that an omission is present in the acceptance numbers 133, since all update data in the time from the base point 1 to the base point 2 are not accepted from the primary DKC 100, the Side File is again accepted from the primary DKC 100 and stored as a Side File to be processed in the secondary DKC 200.

If in S180 it is determined that no omission is present in the acceptance numbers 133, data in the time from the base point 1 to the base point 2 are moved as real data having consistency to an ordinary cache in the cache memory 202 (in S181). Thereafter, the data in the ordinary cache are written to the disk device 210, whereby the data becomes real data having consistency.

In the present embodiment, overwriting is performed during the specified time from the base point 1 to the base point 2 to same records of data, which are un-transferred to the secondary DKC 200 and which are present in the Side File in the cache memory 103 of the primary DKC 100. Accordingly, when performing asynchronous remote copying with data integrity being maintained in time series in units of an update record, even in the case of overwrite I/O data on same records, while the data integrity is being assured, reduction in the amount of transfer data and reduction in processing overhead can be implemented.

By way of example, suppose that a 1,000 iops of updates are made from the host computer 120 for a same record of 4 KB/record. In this case, a transfer of 4 MB data (4 KB/record×1,000 iops=4 MB) is conventionally required; however, according to the present embodiment, it can be reduced to 4 KB maximum.

In addition, suppose that the Side Files are sequentially asynchronously transferred from the primary DKC 100. In this case, even in the event of update I/O data for a same record, a case can be assumed in which the data has already been transferred, so that the update data should be retransferred even within the specified time. However, when the update data during the specified time from the base point 1 to the base point 2 are transferred in batch, efficiency of overwriting on the Side File can be enhanced, and the amount of transfer data can further be reduced.

Further, in the secondary DKC 200, since the data during the specified time are accepted in batch, the accepted data can be handled in the state where the specified time is transparent.

Fourth Embodiment

This embodiment is arranged such that data integrity can be assured even when the remote pair is suspended in each of the first to third embodiments because communication between the primary DKC 100 and the secondary DKC 200 is disabled by communication-path failure or the like.

The storage apparatus of the present embodiment has the same configuration as the first embodiment.

<Operation in the Case of Communication-Path Failure>

Operation in the case of communication-path failure in the storage apparatus according to the fourth embodiment of the present invention will be described hereunder.

When communication between the primary DKC 100 and the secondary DKC 200 is disabled by communication-path failure or the like, the remote copy pair should be suspended. Even in the suspension, the data integrity in the secondary DKC 200 should be assured, and after the suspension is cancelled, update data during the time of the suspension should be reflected into the secondary DKC 200 without omission.

In this case, when all the Side File contents during the transfer of the Side File and in the specified time cannot be transferred to the secondary DKC 200 (because of communication-path failure or the like), the secondary DKC 200 handles the data till the time verified as real data as conventionally if the secondary DKC 200 can verify based on the number of SEQ# overwrites that there is no overwrite within the period. However, data already transmitted to the secondary DKC 200 should be handled as un-transferred data in the primary DKC 100.

Then, in the present embodiment, the operation in the communication-path failure is controlled by using the transfer necessity bit 135 in the write-data management information 105 shown in FIG. 2.

First, the arrangement is made such that the transfer necessity bit 135 shown in FIG. 2 is turned "ON" when update data has been stored as the Side File in the primary DKC 100, and the transfer necessity bit 135 is turned "OFF" when transfer to the secondary DKC 200 has been completed, in which the Side File in the specified time can be deleted from the primary DKC 100 when transfer of all the Side Files during the specified time has normally been completed.

However, when all the Side Files during the specified time cannot be transferred and when the transfer has failed on a midway (because of communication-path failure or the like), all the data in the Side File is managed as differential data that should be transferred to the secondary DKC 200, regardless of the "ON"/"OFF" state of the transfer necessity bit 135 in the Side File.

In addition, in the case of a quickly recoverable transit failure, the suspension is not caused, and data transfer is continued following the state of the transfer necessity bit 135.

Thus, in the present embodiment, data transfer is performed by using the transfer necessity bit 135 in the write-data management information 105 in a normal mode. However, in the event of communication-path failure, all the data in the Side File is managed as differential data that should be transferred to the secondary DKC 200, regardless of the "ON"/"OFF" state of the transfer necessity bit 135. As such, when the storage apparatus has entered the state (communication-path failure or the like) where the remote copy pair should be terminated, also data already transmitted to the secondary DKC 200 can be managed as differential data.

Fifth Embodiment

This embodiment is arranged such that, in each of the first to third embodiments, switching is performed between an overwrite mode for overwriting the Side File and a conventional mode for not overwriting the Side File.

The storage apparatus of the present embodiment has the same configuration as the first embodiment.

<Mode Switching Operation>

Mode switching operation of the storage apparatus according to the fifth embodiment will be described hereunder.

Figure 18:
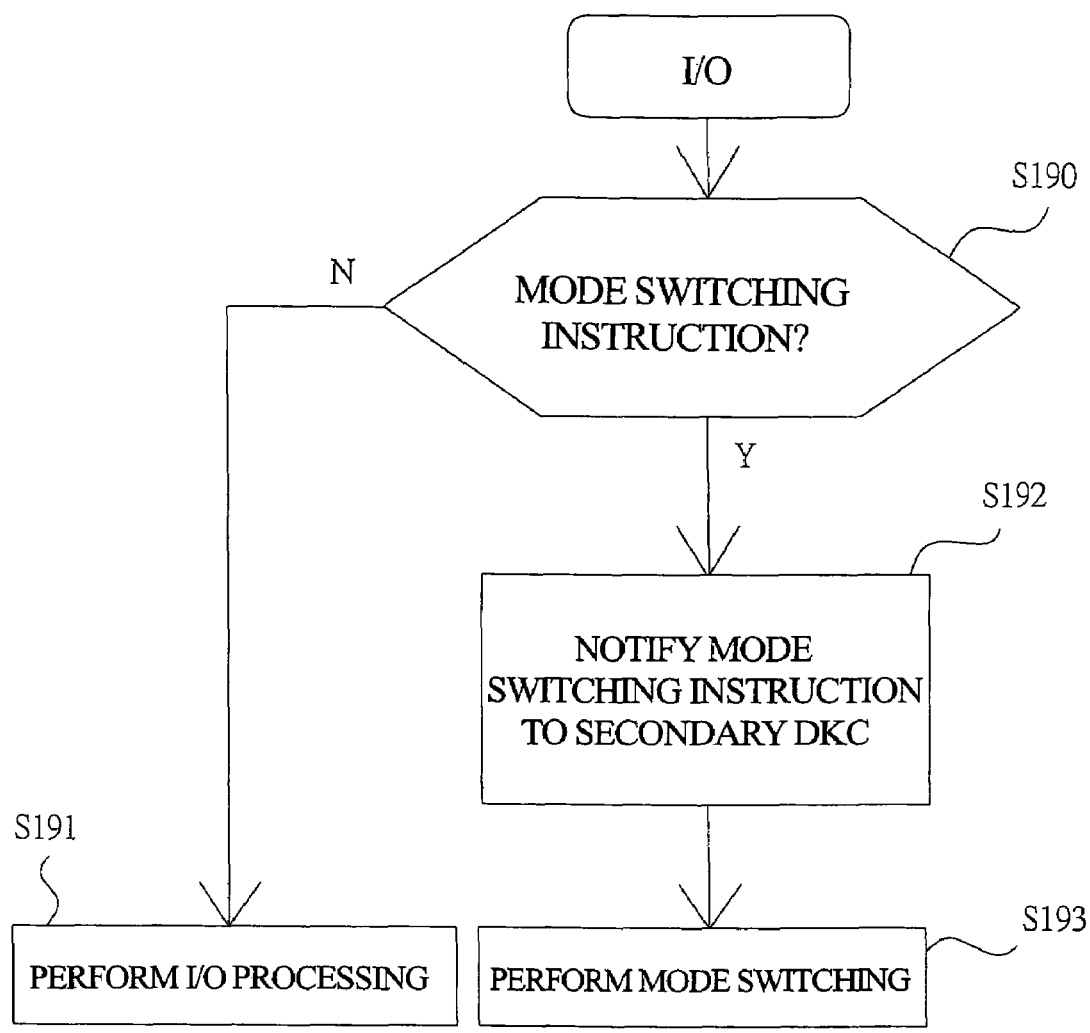
FIG. 18 is an explanatory view for explaining a mode switching operation on the side of the primary DKC of the storage apparatus, according to the fifth embodiment of the present invention.
Figure 19:
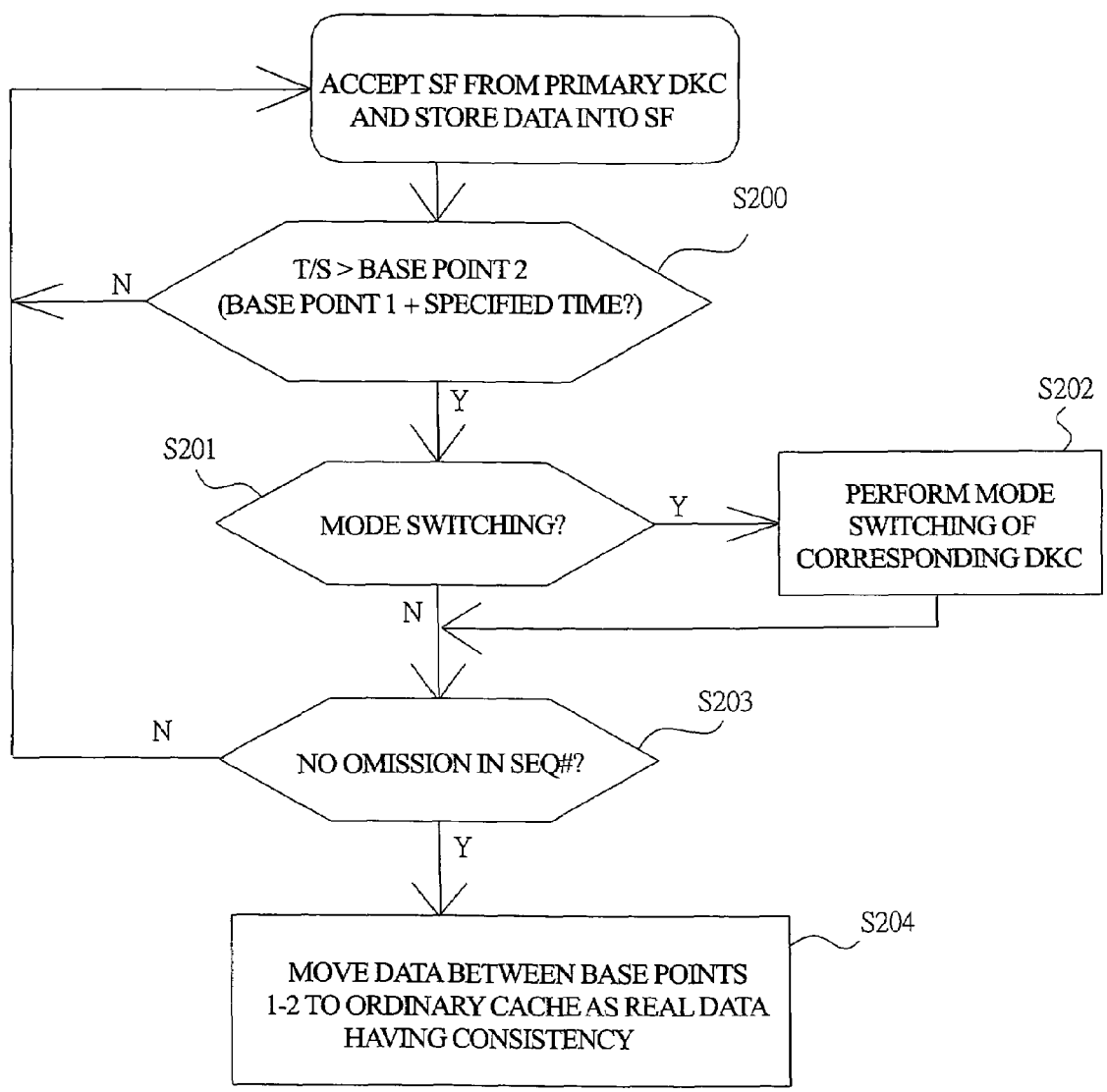
FIG. 19 is a flowchart showing the operation of storing write data on the side of the secondary DKC of the storage apparatus into the cache memory, according to the fifth embodiment of the present invention.

FIG. 17 is an explanatory view for explaining a mode switching operation of the storage apparatus according to the fifth embodiment. FIG. 18 is a flowchart for explaining the mode switching operation on the side of the primary DKC. FIG. 19 is a flowchart showing the operation of storing write data on the side of the secondary DKC into the cache memory.

In the present embodiment, as shown in FIG. 17, a mode switching instruction can be specified from the host computer 120 during the specified time from the base point 1 to the base point 2 (an example is data shown in (5) in FIG. 17, accepted from the host computer 120).

In this manner, the mode switching instruction can be specified in the primary DKC 100 side, whereby the operation can be arbitrarily switched between the overwrite mode and the conventional mode.

When a mode switching instruction has been specified, the primary DKC 100 notifies the instruction to the secondary DKC 200 and performs mode switching after that time, and the secondary DKC 200 performs mode switching in accordance with the mode switching instruction accepted from the primary DKC 100.

By way of operation on the side of the primary DKC 100, as shown in FIG. 18, first, if update I/O data from the host computer 120 is present, it is determined whether the I/O data is a mode switching instruction (in S190). If in S190 it is determined that the I/O data is not a mode switching instruction, normal I/O processing is performed (in S191).

If in S190 it is determined that the I/O data is a mode switching instruction, the mode switching instruction is stored into the Side File. Then, the Side File is transferred to the secondary DKC 200 to thereby notify the mode switching instruction to the secondary DKC 200 (in S192), and performs mode switching (in S193).

By way of operation in the secondary DKC 200 side, as shown in FIG. 19, the Side File is accepted from the primary DKC 100 and stored as a Side File to be processed in the secondary DKC 200 side. Thereafter, it is determined whether the timestamp 152 is greater than a current base point 2 (base point 1+specified time) (in S200). If in S200 it is determined that the timestamp 152 is greater than the base point 2, the Side Files are continually accepted from the primary DKC 100 until S200 determines the timestamp 152 to be greater than the base point 2. Then, if in S200 it is determined that the timestamp 152 is greater than the base point 2, the operation verifies whether the mode switching instruction is present in the Side File to determine whether mode switching is required (in S201).

If in S201 it is determined that mode switching is required, mode switching of the DKC is performed (in S202). If in S201 it is determined that the mode switching is not required, it is determined whether an omission is present in acceptance numbers 133 for update data during the time from the base point 1 to the base point 2 (in S203).

If in S203 it is determined an omission is present in the acceptance numbers 133, since all update data during the time from the base point 1 to the base point 2 are not accepted from the primary DKC 100, the Side File is again accepted from the primary DKC 100 and stored as a Side File to be processed in the secondary DKC 200.

If in S203 it is determined that no omission is present in the acceptance numbers 133, data in the time from the base point 1 to the base point 2 are moved as real data having consistency to the ordinary cache in the cache memory 202 (in S204). Thereafter, the data in the ordinary cache are written to the disk device 210, whereby the data becomes real data having consistency.

In the present embodiment, by way of the storage mode of the Side File, in the overwrite mode for overwriting the Side File, it should be waited for the time to the base point 2 or the synchronization point until the data is handled as real data on the side of secondary DKC 200. While the time lag with respect to the primary DKC 100 is increased, when priority is placed on the conformity between the primary DKC 100 and the secondary DKC 200, as in the case of switching the mode to the conventional mode, the storage mode of the Side File can be switched during operation, therefore enabling the adjustment of, for example, conformity in data of the primary DKC 100 and the secondary DKC 200, the data discard amount in the secondary DKC 200 in the event of failure of the primary DKC 100.

In the present embodiment, as explained in the example of specification of the mode switching instruction from the host computer 120, the switching instruction for the overwrite mode and the conventional mode may be specified by a determination of the primary DKC 100 (for example, the determination may be made when the Side File is fully loaded due to excessive update I/O data).

Sixth Embodiment

This embodiment is arranged such that, in the fifth embodiment, when the configuration is formed of a plurality of primary DKCs 100 and a single secondary DKC 200 and the data integrity is assured, the operation mode in units of the primary DKCs 100 is managed in the secondary DKC 200.

The storage apparatus of the present embodiment has the same configuration as the first embodiment, in which the configuration is formed such that a plurality of primary DKCs 100 are connected with a single secondary DKC 200.

<Mode Switching from Plurality of Primary DKCs>

Mode switching operation of the storage apparatus according to the sixth embodiment will be described hereunder.

Figure 20:
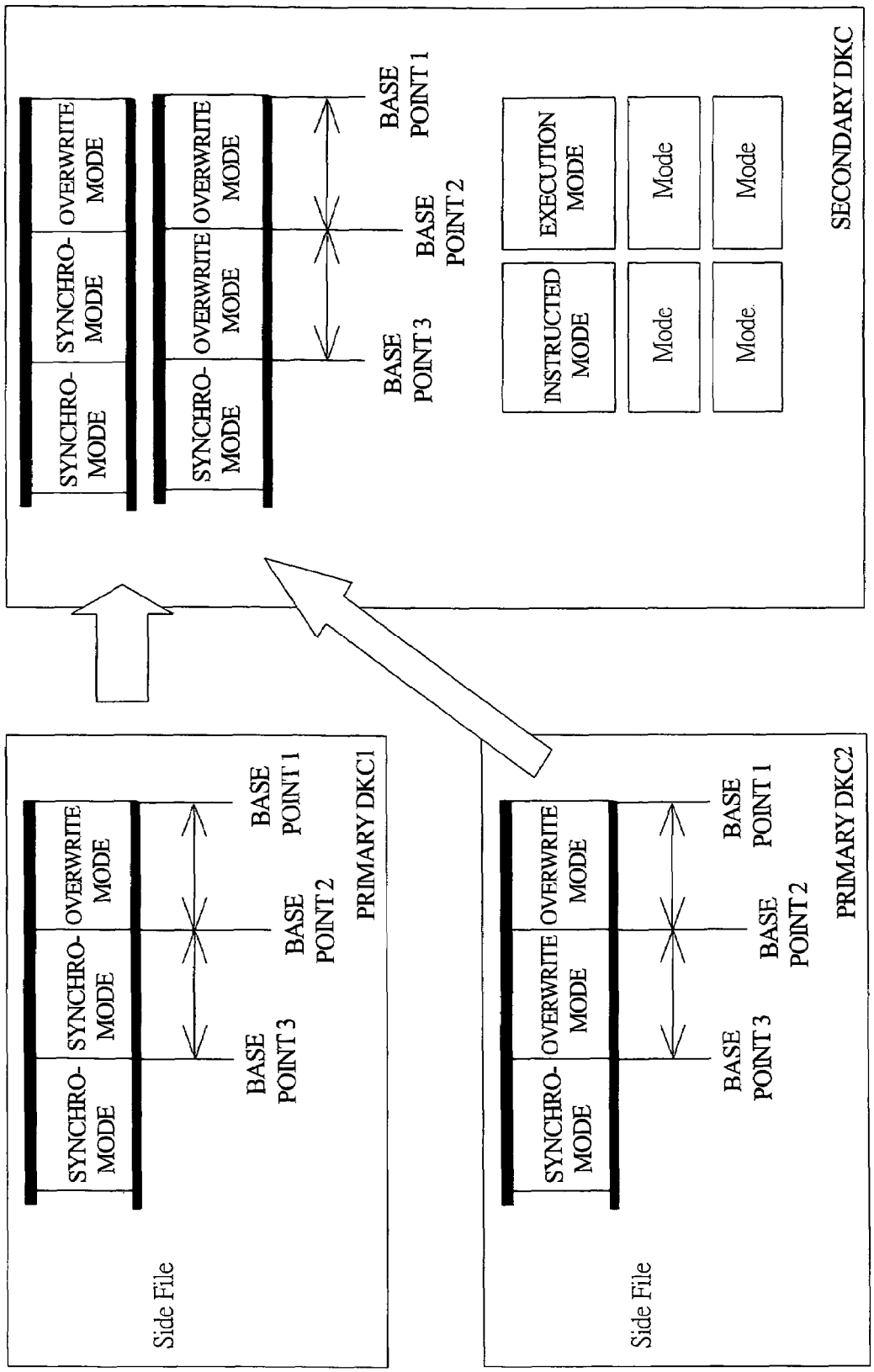
FIG. 20 is an explanatory view for explaining a mode switching operation of a storage apparatus, according to a sixth embodiment of the present invention.
Figure 21:
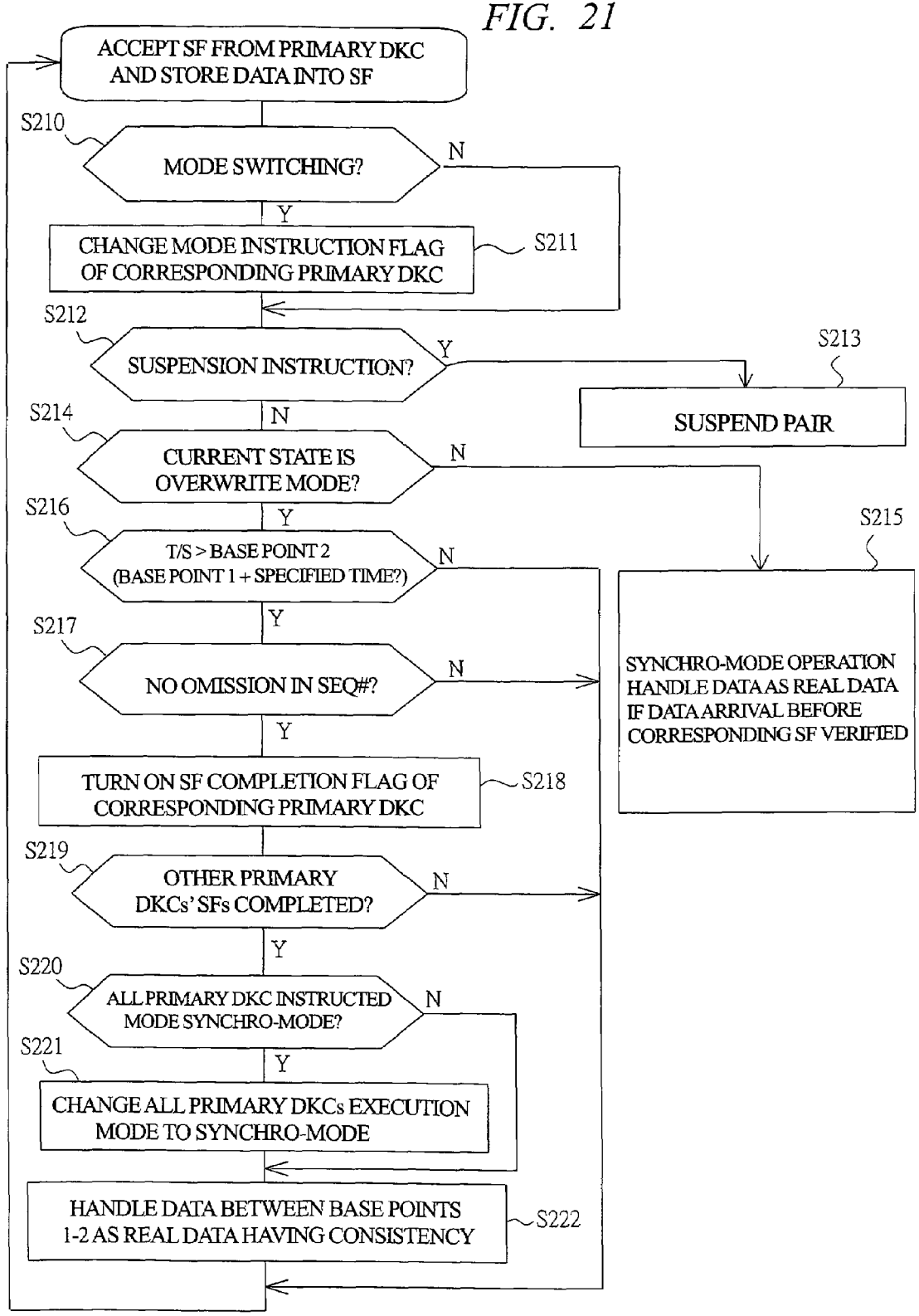
FIG. 21 is a flowchart showing the operation of storing write data on the side of a secondary DKC of the storage apparatus into the cache memory, according to the sixth embodiment of the present invention.

FIG. 20 is an explanatory view for explaining the mode switching operation of the storage apparatus according to the sixth embodiment. FIG. 21 is a flowchart showing the operation of storing write data on the side of a secondary DKC into the cache memory.

In the present embodiment, as shown in FIG. 20, mode switching instructions from the plurality of primary DKCs 100 are managed in the secondary DKC 200 side. In the secondary DKC 200 side, the operation mode for creating real data remains unchanged until the operation modes of all the primary DKCs 100 conform to one another; and when the operation modes of all the primary DKCs 100 have conformed to one another, the operation mode in the secondary DKC 200 side is changed. In addition, when the overwrite mode and the conventional mode (synchronization mode) are mixed, the Side File is handled in the overwrite mode for all the cases in the secondary DKC 200.

By way of operation on the side of the primary DKC 100, similar to the operation in the fifth embodiment shown in FIG. 18, first, if update I/O data from the host computer 120 is present, it is determined whether the I/O data is a mode switching instruction (in S190). If in S190 it is determined that the I/O data is not a mode switching instruction, normal I/O processing is performed (in S191).

If in S190 it is determined that the I/O data is a mode switching instruction, the mode switching instruction is stored into the Side File. Then, the Side File is transferred to the secondary DKC 200 to thereby notify mode switching instruction to the secondary DKC 200 (in S192), and performs mode switching (in S193).

By way of operation in the secondary DKC 200 side, as shown in FIG. 21, the Side File is accepted from the primary DKC 100 and stored as a Side File to be processed in the secondary DKC 200 side. Thereafter, it is determined whether the mode switching instruction is present in the Side File to determine whether mode switching is required (in S210).

If in S210 it is determined that mode switching is required, mode switching of the DKC is performed (in S211). If in S210 it is determined that mode switching is not required, it is then determined whether the instruction is a suspension instruction (in S212). If in S212 it is determined that the instruction is a suspension instruction, a pair of the primary DKC 100 and the secondary DKC 200 is suspended (in S213).

If in S212 it is determined that instruction is not a suspension instruction, it is then determined whether the current state is the overwrite mode (in S214). If in S214 it is determined whether the current state is not the overwrite mode, the operation is executed in the synchronization mode, which is the conventional mode; and data arrival before the Side File can be verified, the data is handled as real data (in S215).

If in S214 it is determined that the current state is the overwrite mode, it is then determined whether the timestamp 152 is greater than a current base point 2 (base point 1+specified time) (in S216). If in S216 it is determined that the timestamp 152 is greater than the base point 2, the Side Files are continually accepted from the primary DKC 100 until S216 determines the timestamp 152 to be greater than the base point 2. Then, if in S216 it is determined that the timestamp 152 is greater than the base point 2, it is determined whether an omission is present in acceptance numbers 133 for update data during the time from the base point 1 to the base point 2 (in S217).

If in S217 it is determined that an omission is present in the acceptance numbers 133, since all update data during the time from the base point 1 to the base point 2 are not accepted from the primary DKC 100, the Side File is again accepted from the primary DKC 100 and stored as a Side File to be processed in the secondary DKC 200.

If in S217 it is determined that no omission is present in the acceptance numbers 133, a Side File of the primary DKC 100 completion flag is turned "ON." Then, it is determined whether all the Side Files of other primary DKCs 100 are completed (in S219). If in S219 it is determined that all the Side Files of the other primary DKCs 100 are not completed, the Side Files are accepted from the primary DKC 100 and stored as Side Files to be processed in the secondary DKC 200 side.

If in S219 it is determined that all the Side Files of the other primary DKCs 100 are completed, it is then determined whether instructed modes of all the primary DKCs 100 are each the synchronization mode, which is the conventional mode (in S220). If in S220 it is determined that each of all the primary DKC 100 is the synchronization mode, an execution mode of each of all the primary DKCs 100 is changed to the synchronization mode (in S221), and the data during the time from the base point 1 to the base point 2 is handled as real data having consistency. If in S220 it is determined that the instruction mode of each of all the primary DKC 100 is not the synchronization mode, the execution mode of each of all the primary DKCs 100 is remained unchanged to the synchronization mode (in S221), and the data during the time from the base point 1 to the base point 2 is handled as real data having consistency.

In the present embodiment, when changing the operation modes between the plurality of primary DKCs 100 and the single secondary DKC 200, the operation modes are managed in the secondary DKC 200 side, wherein the operation mode in the secondary DKC 200 side is changed when the operation modes of the plurality of primary DKCs 100 conform to one another. Accordingly, without using additional communication means, nonconformity in the operation modes becomes tolerable in the control of the secondary DKC 200. In addition, the operation-mode changing technique can easily be employed in the environment of the plurality of primary DKCs 100.

Thus, in the present embodiment, description has been made with reference to the example in which the mode switching instruction is issued from the host computer 120. However, the arrangement may be such that, similar to the fifth embodiment, the switching instruction for the overwrite mode and the conventional mode may be specified by a determination of the primary DKC 100 (for example, the determination may be made when the Side File is fully loaded due to excessive update I/O data).

According to the present invention, when performing the asynchronous remote copying to attain the time-series data integrity in units of the update record, even in the case of overwrite I/O data on same records, while the data integrity is being assured, reduction in the amount of transfer data and reduction in processing overhead can be implemented.

Further, according to the present invention, since the synchronization point is used in the primary disk controller, a midpoint can be detected only by detecting the synchronization point in the secondary disk controller, and the synchronization point can be arbitrarily controlled therein.

FIG. 1
120 HOST COMPUTER
1 WRITE REQUEST
152 TIMESTAMP
151 WRITE DATA
101 PRIMARY WRITE-DATA ACCEPTING SECTION
102 PRIMARY WRITE-DATA TRANSMITTING SECTION
151 WRITE DATA
103 CACHE MEMORY

108 DISK-DATA TRANSMISSION/RECEPTION SECTION
105 WRITE -DATA MANAGEMENT INFORMATION
106 SEQ# MASTER DATASET
107 REFERENCE-POINT MANAGEMENT INFORMATION
2 CONTROL MEMORY
3 PRIMARY DKC
110 DISK DEVICE
201 SECONDARY WRITE-DATA ACCEPTING SECTION
204 SECONDARY WRITE-DATA CONSISTENCY MAINTAINING SECTION
4 SECONDARY DKC

FIG. 2
130 DISK DEVICE ADDRESS
131 WRITE ADDRESS
132 WRITE TIME (TIMESTAMP)
133 ACCEPTANCE NUMBER
134 WRITE DATA POINTER
135 TRANSFER NECESSITY BIT

FIG. 3
SIDE FILE
  PRIMARY DKC SIDE
  SECONDARY DKC SIDE

FIG. 4
  BASE POINT 1
  BASE POINT 2
  PRIMARY DKC SIDE
  SPECIFIED TIME
  BASE POINT 1
  BASE POINT 2
  SECONDARY DKC SIDE

FIG. 5
1 UPDATE I/O DATA
S100 T/S OF UPDATE I/O DATA>BASE POINT 2 (BASE POINT 1+SPECIFIED TIME?)
S101 CORRESPONDING RECORD IS PRESENT IN SF?
S103 ADD TO SF
S102 OVERWRITE SF

FIG. 6
1 ASYNCHRONOUS CYCLE PROCESSING
S110 TRANSFER DATA FROM TOP OF SF TO SECONDARY DKC

FIG. 7
1 ACCEPT SF FROM PRIMARY DKC AND STORE DATA INTO SF
S120 T/S>BASE POINT 2 (BASE POINT 1+SPECIFIED TIME?)
S121 NO OMISSION IN SEQ#?
S122 MOVE DATA BETWEEN BASE POINTS 1-2 TO ORDINARY CACHE AS REAL DATA HAVING CONSISTENCY

FIG. 8
  BASE POINT 1
  BASE POINT 2
  SPECIFIED TIME
  PRIMARY DKC SIDE
  NUMBER OF OVERWRITES
  BASE POINT 1
  BASE POINT 2
  SECONDARY DKC SIDE

FIG. 9
  BASE POINT 1
  BASE POINT 2
  SPECIFIED TIME
  PRIMARY DKC SIDE
  BASE POINT 1
  BASE POINT 2
  SECONDARY DKC SIDE

FIG. 10
  UPDATE I/O DATA
S130 T/S OF UPDATE I/O DATA>BASE POINT 2 (BASE POINT 1+SPECIFIED TIME??)
S131 CORRESPONDING RECORD IS PRESENT IN SF?
S133 SPECIFY SYNCHRONIZATION POINT TO SF
S134 ADD TO SF
S132 OVERWRITE SF

FIG. 11
  ASYNCHRONOUS CYCLE PROCESSING
S140 TRANSFER DATA FROM TOP OF SF TO SECONDARY DKC
S141 CURRENT TIME>BASE POINT 2 (BASE POINT 1+SPECIFIED TIME??)
S142 SPECIFY SYNCHRONIZATION POINT TO SF

FIG. 12
  SYNCHRONIZATION REQUEST FROM HOST COMPUTER
S150 SPECIFY SYNCHRONIZATION POINT TO SF

FIG. 13
  ACCEPT SF FROM PRIMARY DKC AND STORE DATA INTO SF
S160 SF WITH SYNCHRONIZATION POINT?
S162 ACCEPT SF FROM PRIMARY DKC AND STORE DATA INTO SF
S161 ALL SEQ# HAVE BEEN ACCEPTED?
S162 MOVE DATA BETWEEN BASE POINT 1 AND SYNCHRONIZATION POINT TO ORDINARY CACHE AS REAL DATA HAVING CONSISTENCY

FIG. 14
  BASE POINT 1
  BASE POINT 2
  SPECIFIED TIME
  PRIMARY DKC SIDE
  BASE POINT 1
  BASE POINT 2
  SECONDARY DKC SIDE

FIG. 15
  UPDATE I/O DATA
S170 T/S OF UPDATE I/O DATA>BASE POINT 2 (BASE POINT 1+SPECIFIED TIME?)
S171 CORRESPONDING RECORD IS PRESENT IN SF?
S172 OVERWRITE SF
S173 ADD TO SF
S174 ADD TO SF
S175 TRANSFER SF DATA BETWEEN BASE POINTS 1-2 TO SECONDARY DKC

FIG. 16
  ACCEPT SF FROM PRIMARY DKC AND STORE DATA INTO SF
S180 NO OMISSION IN SEQ#?
S181 MOVE DATA BETWEEN BASE POINT 1-2 TO ORDINARY CACHE AS REAL DATA HAVING CONSISTENCY

FIG. 17
   S: SWITCHING
   BASE POINT 1
   BASE POINT 2
   SPECIFIED TIME
   PRIMARY DKC SIDE
   S: SWITCHING
   BASE POINT 1
   BASE POINT 2
   SECONDARY DKC SIDE

FIG. 18
S190 MODE SWITCHING INSTRUCTION?
S192 NOTIFY MODE SWITCHING INSTRUCTION TO SECONDARY DKC
S191 PERFORM I/O PROCESSING
S193 PERFORM MODE SWITCHING

FIG. 19
   ACCEPT SF FROM PRIMARY DKC AND STORE DATA INTO SF
S200 T/S>BASE POINT 2 (BASE POINT 1+SPECIFIED TIME?)
S201 MODE SWITCHING?
S202 PERFORM MODE SWITCHING OF CORRESPONDING DKC
S203 NO OMISSION IN SEQ#?
S204 MOVE DATA BETWEEN BASE POINTS 1-2 TO ORDINARY CACHE AS REAL DATA HAVING CONSISTENCY

FIG. 20
   SYNCHRO-MODE
   BASE POINT 1
   BASE POINT 2
   BASE POINT 3
   PRIMARY DKC1
   SYNCHRO-MODE
   BASE POINT 1
   BASE POINT 2
   BASE POINT 3
   PRIMARY DKC2
   SYNCHRO-MODE
   OVERWRITE MODE
   BASE POINT 1
   BASE POINT 2
   BASE POINT 3
   INSTRUCTED MODE
   EXECUTION MODE
   SECONDARY DKC

FIG. 21
   ACCEPT SF FROM PRIMARY DKC AND STORE DATA INTO SF
S210 MODE SWITCHING?
S211 CHANGE MODE INSTRUCTION FLAG OF CORRESPONDING PRIMARY DKC
S212 SUSPENSION INSTRUCTION?
S213 SUSPEND PAIR
S214 CURRENT STATE IS OVERWRITE MODE?
S215 SYNCHRO-MODE OPEPATION
   HANDLE DATA AS REAL DATA IF DATA ARRIVAL BEFORE CORRESPONDING SF VERIFIED
S216 T/S>BASE POINT 2 (BASE POINT 1+SPECIFIED TIME?)
S217 NO OMISSION IN SEQ#?
S218 TURN ON SF COMPLETION FLAG OF CORRESPONDING PRIMARY DKC
S219 OTHER PRIMARY DKCs'SFs COMPLETED?
S220 ALL PRIMARY DKC INSTRUCTED MODE SYNCHRO-MODE?
S221 CHANGE ALL PRIMARY DKCs EXECUTION MODE TO SYNCHRO-MODE
S222 HANDLE DATA BETWEEN BASE POINTS 1-2 AS REAL DATA HAVING CONSISTENCY

The invention claimed is:

1. A primary disk controller being configured to be coupled to at least one host computer and a plurality of first disk devices and being configured to receive a first plurality of data sent from the a host computer, the primary disk controller comprising:
   one or more data control sections; and
   a first cache memory,
   wherein
     the one or more data control sections manage a plurality of sequence information, each of which is provided to one of the first plurality of data in a received order by the primary disk controller, and manage overwrite information, which is increased, if two or more of the first plurality of data are to be written to a common record during a time period,
     the one or more data control sections, if the two or more of the first plurality of data are to be written to the common record during the time period, manage a latest update data, which is a latest data overwritten to the common record during the time period, and write a second plurality of data, which include the latest update data and one or more data other than data to be updated by the latest update data, to at least one of an area of the first cache memory and an area of the first plurality of disk devices, and transfer the second plurality of data to a secondary disk controller by the remote copy process, so that the secondary disk controller receives one or more of the second plurality of data from the primary disk controller, and verifies whether a set of the second plurality of data is received based on the plurality of sequence information, the overwrite information and a sequence information of data to be received during a subsequent time period of the time period, and writes the second plurality of data to an area of a second cache memory of the secondary disk controller based on the plurality of sequence information, if the set of the second plurality of data is received.

2. A primary disk controller according to claim 1, wherein the one or more data control sections manage a plurality of timestamps, each of the timestamps is associated to one of the first plurality of data and is provided by the host computer or the one or more data control sections.

3. A primary disk controller according to claim 1, wherein the time period is between a first base point and a second base point and the time periods are synchronized with each other between the primary disk controller and the secondary disk controller.

4. A primary disk controller according to claim 3, wherein in the primary disk controller, the second base point is stored as a synchronization point into the first cache memory of the primary disk controller.

5. A primary disk controller according to claim 4, wherein the synchronization point is stored into the first cache memory of the primary disk controller in response to a synchronization request from the host computer.

6. A primary disk controller according to claim 1, wherein the one or more data control sections store the plurality of sequence information, the overwrite information and the sequence information of data to be received during the subsequent time period into a control memory of the primary disk controller.

7. A primary disk controller according to claim 1, wherein the one or more data control sections transfer in batch the set of the second plurality of data to the secondary disk controller.

8. A secondary disk controller being configured to be coupled to a primary disk controller, the primary disk controller including a first cache memory and being configured to be coupled to at least one host computer and a plurality of first disk devices and being configured to receive a first plurality of data sent from the a host computer, the secondary disk controller comprising:
one or more data control sections being configured to receive data sent from the primary disk controller by a remote copy process and being configured to be coupled to a plurality of second disk drives; and
a second cache memory,
wherein
the one or more data control sections are configured to receive one or more of a second plurality of data sent from the primary disk controller by a remote copy process, the second plurality of data include a latest update data and one or more data other than data to be updated by the latest update data,
the latest data is a latest data overwritten to a common record of at least one of an area of the first cache memory and an area of the first disk devices during a time period, if two or more of the first plurality of data are to be written to the common record during the time period,
the one or more data control sections verify whether a set of the second plurality of data is received based on a plurality of first sequence information, a overwrite information and a second sequence information,
each of the plurality of first sequence information being provided to one of the first plurality of data in a received order by the primary disk controller,
the overwrite information, which is increased, if the two or more of the first plurality of data are to be written to the common record during the time period,
the second sequence information is information of sequence of data to be received during a subsequent time period of the time period, and
the one or more data control sections write the second plurality of data to a at least one of an area of the second cache memory and an area of the plurality of second disk devices based on the plurality of first sequence information, if the set of the second plurality of data is received.

9. A storage system according to claim 8, wherein
the time period is between a first base point and a second base point, and
the time periods are synchronized with each other between the primary disk controller and the secondary disk controller.

10. A storage system according to claim 8, wherein
in the secondary disk controller, the set of the second plurality of data is handled as data with consistency.

11. A storage system comprising:
a primary disk controller including a first cache memory, and being configured to be coupled to at least one host computer and a plurality of first disk devices, and being configured to receive a first plurality of data sent from the a host computer; and a secondary disk controller including a second cache memory, and being configured to be coupled to the primary disk controller and a plurality of second disk devices, and being configured to receive data sent from the primary disk controller by a remote copy process,
wherein
the primary disk controller manages a plurality of sequence information, each of which is provided to one of the first plurality of data in a received order by the primary disk controller, and manages overwrite information, which is increased, if two or more of the first plurality of data are to be written to a common record during a time period, the primary disk controller, if the two or more of the first plurality of data are to be written to the common record during the time period, manages a latest update data, which is a latest data overwritten to the common record during the time period, and writes a second plurality of data, which include the latest update data and one or more data other than data to be updated by the latest update data, to at least one of an area of the first cache memory and an area of the first plurality of disk devices, and transfers the second plurality of data to the secondary disk controller by the remote copy process,
the secondary disk controller receives one or more of the second plurality of data from the primary disk controller, and verifies whether a set of the second plurality of data is received based on the plurality of sequence information, the overwrite information and a sequence information of data to be received during a subsequent time period of the time period, and writes the second plurality of data to at least one of an area of the second cache memory and an area of the plurality of second disk devices based on the plurality of sequence information, if the set of the second plurality of data is received.

12. A storage system according to claim 11, wherein
the primary disk controller manages a plurality of timestamps, each of the timestamps is associated to one of the first plurality of data and is provided by the host computer or the primary disk controller.

13. A storage system according to claim 11, wherein
the time period is between a first base point and a second base point, and the time periods are synchronized with each other between the primary disk controller and the secondary disk controller.

14. A storage system according to claim 13, wherein
in the primary disk controller, the second base point is stored as an synchronization point into the first cache memory of the primary disk controller; and
in the secondary disk controller, the set of the second plurality of data is handled as real data with consistency.

15. A storage system according to claim 14, wherein
the synchronization point is stored into the first cache memory of the primary disk controller in response to a synchronization request from the host computer.

16. A storage system according to claim 11, wherein; the primary disk controller stores the plurality of sequence information, the overwrite information and the sequence information of data to be received during the subsequent time period into a control memory of the primary disk controller.

17. A storage system according to claim 11, wherein
the primary disk controller transfers in batch the set of the second plurality of data to the secondary disk controller.

18. A storage system according to claim 11, wherein
a mode for overwriting and a mode for not overwriting the two or more of the first plurality of data in the common record in the first cache memory of the primary disk controller are provided, upon acceptance of a mode switching instruction from the host computer, mode switching information is stored into the first cache memory of the primary disk controller, and the mode switching information is transferred from the primary disk controller to the secondary disk controller, and in the secondary disk controller, an operation mode is changed in accordance with the mode switching information transferred from the primary disk controller.

19. A storage system according to claim 18, wherein
the mode switching information is stored into the first cache memory of the primary disk controller in accordance with a processing state of the first plurality of data in the primary disk controller.

* * * * *